United States Patent
Watson

(10) Patent No.: US 10,343,063 B2
(45) Date of Patent: Jul. 9, 2019

(54) SYSTEM AND METHOD FOR PLAYING A GAME

(71) Applicant: Deidre Maria Watson, Rocklin, CA (US)

(72) Inventor: Deidre Maria Watson, Rocklin, CA (US)

(*) Notice: Subject to any disclaimer, the term of this patent is extended or adjusted under 35 U.S.C. 154(b) by 316 days.

(21) Appl. No.: 15/209,564

(22) Filed: Jul. 13, 2016

(65) Prior Publication Data

US 2017/0189806 A1 Jul. 6, 2017

Related U.S. Application Data

(60) Provisional application No. 62/231,633, filed on Jul. 13, 2015.

(51) Int. Cl.
| | | |
|---|---|---|
| *A63F 13/00* | (2014.01) | |
| *A63F 13/33* | (2014.01) | |
| *A63F 13/30* | (2014.01) | |
| *H04L 29/08* | (2006.01) | |

(52) U.S. Cl.
CPC .............. *A63F 13/33* (2014.09); *A63F 13/30* (2014.09); *H04L 67/00* (2013.01)

(58) Field of Classification Search
None
See application file for complete search history.

(56) References Cited

U.S. PATENT DOCUMENTS

| | | | | |
|---|---|---|---|---|
| 5,892,900 A | * | 4/1999 | Ginter | G06F 21/10 726/26 |
| 5,910,987 A | * | 6/1999 | Ginter | G06F 21/10 348/E5.006 |
| 7,095,854 B1 | * | 8/2006 | Ginter | G06F 21/10 380/231 |
| 2002/0048369 A1 | * | 4/2002 | Ginter | G06F 21/10 380/277 |
| 2003/0191719 A1 | * | 10/2003 | Ginter | G06F 21/10 705/54 |
| 2004/0054630 A1 | * | 3/2004 | Ginter | G06F 21/10 705/53 |
| 2004/0133793 A1 | * | 7/2004 | Ginter | G06F 21/10 713/193 |
| 2005/0177716 A1 | * | 8/2005 | Ginter | G06F 21/10 713/157 |
| 2006/0224667 A1 | | 10/2006 | Amir et al. | |

(Continued)

*Primary Examiner* — Paul A D'Agostino
(74) *Attorney, Agent, or Firm* — Ariel S. Bentolila; Bay Area IP Group, LLC

(57) ABSTRACT

A host server is configured to receive and process a website address request from a remote client via a global network. A webpage interface module of the host server, is configured to receive and process a game application download request from the remote client via the global network. A first user may load the installed interactive game software on a first remote client to run an interactive game application. The first user may also enter sign-in information in the interactive game application to gain access to features and functionalities of the interactive game application. The first user may send a second user information and an invite request to the host server. The second user, using a second remote client, may accept a game with the first user, using the first remote client, with an interactive game application running on the second remote client.

20 Claims, 16 Drawing Sheets

(56) References Cited

U.S. PATENT DOCUMENTS

2007/0073549 A1  3/2007  Terrill et al.
2010/0233667 A1* 9/2010  Wilson .................... G09B 7/00
                                                    434/362

* cited by examiner

SYSTEM AND METHOD FOR PLAYING A GAME

CROSS-REFERENCE TO RELATED APPLICATIONS

The present Utility patent application claims priority benefit of the U.S. provisional application for patent Ser. No. 62/231,633 entitled "INTERACTIVE COMPATIBILITY GAME APPLICATION", filed on 13 Jul. 2015 under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a software game application. More particularly, certain embodiments of the invention relate to an interactive software game application and system thereof.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It may be contemplated that compatibility games have been in use for years. Typically, conventional compatibility games may comprise board games, card games, computer games and dating websites. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that with conventional compatibility games, individuals may be seeking a dating partner or life partner (including members of dating websites), wherein the individuals usually may only disclose basic personal information (e.g. height, eye color, ethnicity, likes, dislikes, etc.) to others in the initial stage of meeting. Thus, when a member of a dating website or those seeking a partner, may find a potential dating candidate, the initial conversation may typically be shallow or superficial because it is believed that most individuals may not know the right questions to ask or may be apprehensive in asking. In other conventional compatibility games, board games and/or card games may be utilized and may require players to play the game in a same location. Furthermore, those seeking a dating partner or potential mate may meet individuals they may not know (strangers), and it is believed that meeting someone in person, to get to know them, may not always be comfortable, safe or feasible. Moreover, it is believed that some individuals may not feel comfortable answering personal questions in the presence of other individuals, therefore, it is further contemplated that when playing in person, it may be difficult to tell someone you don't want to see them again if you're not interested in them.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A illustrates a start of the processing and FIG. 4B illustrates an end thereof;

Figure 1:
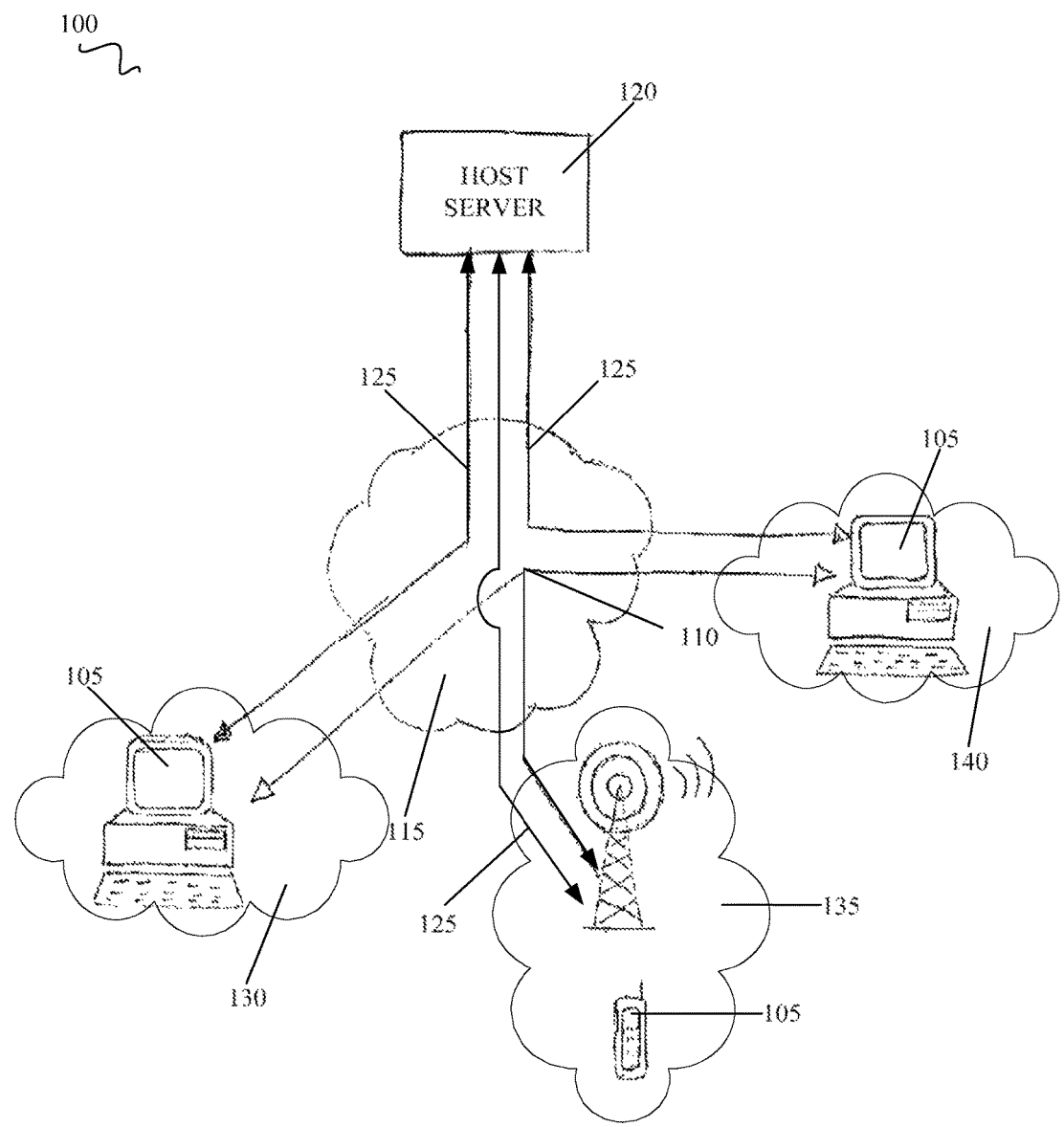
FIG. 1 illustrates an exemplary game system architecture of an interactive game application embodiment, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, users, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

As will be described in some detail below, many embodiments of the present invention may provide means and/or methods of providing a multiplicity of users an interactive game application and further facilitating execution of the game application via an internet browser in communication on users' mobile devices and/or computing devices, such as, without limitation, a desktop personal computer (PC), laptop, workstation, personal, digital assistance device (PDA), tablet, mobile phone, or any other device capable of interfacing via the internet browser or any other communication network. Some of these embodiments may comprise computer software. In some embodiments, software may be integrated into hardware, including, without limitation, uniquely-designed hardware for running embodiment software. The software, may be accessed by an internet browser of a mobile device or computing device and may cause the devices to facilitate, via graphical user interfaces (GUI)s, a series of identical life and relationship style questions, one by one, to users (who have agreed to play the game together) simultaneously. The users may choose an answer from a multiple choice list facilitated by the game application. Each user may answer a respective question and each user's answer may be shown to the other user. Each user may have the option to continue or discontinue playing the game. If each user agrees to continue to play, another subject category may be selected and the devices may generate another identical pair of questions for the users to answer. This process may be continued until one or both users discontinues playing or when all the game questions are answered. It may be contemplated that, in some embodiments, the answers provided by each user may assist the other user in determining for example, an without limitation, areas they have in common, personality traits, love languages, financial habits, life goals, future plans, living styles, work ethics, educational background, family goals, fitness habits, likes and dislikes, skill sets, etc., by the users being able to learn about each other and thus assisting them determining if they may be compatible for a multiplicity of relationship types such as, without limitation, a romantic relationship, a work relationship, a roommate relationship, a friendship, a mentorship, etc. For example, and without limitation, a question may be "are you open to having sex before marriage?", "do you use coupons?", "do you wash dishes immediately after using them?", "are you currently employed?", "do you have good time management skills?", "can you multitask well?", "have you been told that you are good listener?" etc. Optimally, a relatively large number of questions may be provided in order to check a broad range of attributes, characteristics and other features of each player to give each player the opportunity to determine suitability with the other player. Therefore, it may be further contemplated that some embodiments of the present invention may facilitate a selection of a best or most compatible player for a possible future particular relationship.

FIG. 1 illustrates an exemplary game system architecture 100 of an interactive game application embodiment, in accordance with an embodiment of the present invention. In the present embodiment, the game system architecture may include a multiplicity of remote clients 105 which may be in communication with each other via communication channel 110 and global network 115, wherein each of the multiplicity of remote clients may include a processing unit which may further include hardware and software modules configured to execute computer-readable instructions for facilitating an interactive game application, in accordance with an embodiment of the present invention. The plurality of remote clients may also include for example, without limitation, a desktop personal computer (PC), laptop, workstation, personal digital assistance device (PDA), tablet, cellular phone, gaming console, media streaming device or any other device capable of accessing the global network. In the present embodiment the global network may include, without limitation, the internet and/or cellular telephone networks, wherein the global network may operate to transfer information between various networked elements. It will be understood by those skilled in the art that the global network may be of many different forms. In some embodiments the network may include, for example, and without limitation, an intranet, an extranet, local area networks (LANs), wide area networks (WANs), a virtual private network (VPN), non-TCP/IP based networks, wired telephone networks, or any other network that may support data communication between respective entities via hardwired or wireless communication networks. In the present embodiment, game system architecture 100 may further include a host server 120 which may be accessed by at least one of the multiplicity of remote clients via communication channel 125 and the global network, wherein the host server may include a multiplicity of servers and executable computer-readable instructions for receiving a request from at least one of the multiplicity of remote clients and downloading computer-readable instructions to at least one of the multiplicity of remote clients for facilitating a game application, in accordance with an embodiment of the present invention. Furthermore, the host server may also include executable computer-readable instructions to facilitate a webpage that may be accessed by at least one user, using at least one of the multiplicity of remote clients. The host server may also include executable computer-readable instructions to facilitate registering users. In the present embodiment, the host server may include one or more data storage devices, wherein the one or more data storage devices may store retrievable data. The retrievable data may be used in facilitating a game application, in accordance with an embodiment of the present invention. Furthermore, the retrievable data may include, without limitation, computer-readable instructions to install game application software, computer-readable instructions to display a multiplicity of screens of a game application, links and other address related to the game application, computer-readable instructions allowing or inhibiting an interaction with the game application, computer-readable instruction to facilitate entry fields, metadata related to dynamic and static features of the game application, databases of users' contact information, personal information, users' registration data, users' personality traits, usage information, users' partner and relationship status information, users' income, pictures, question categories, advice tips, questions, question answers, compatibility percentages, location information, game status information, continue options any other game and user related information that may be sent to the users, or a combination thereof.

In the present embodiment game system architecture 100, may also include a multiplicity of local network regions with a sampling of regions denoted as a local network region 130, a local network region denoted as 135, and a local network region denoted as 140. Each of the local network regions may operate to represent respective networks contained within a geographical area or region. Non-limiting examples of representations for the geographical areas for the local networked regions may include postal zip codes, telephone area codes, states, counties, cities and countries. Elements within local network region 130, 135, and 140 may operate to communicate with external elements within other networked regions or within elements contained within the same network region.

In the present embodiment, the host server and multiplicity of servers included therein may operate to execute computer-readable instructions, store information, support storage device operations and communicate with other networked elements. Non-limiting examples of computer-readable and scripting languages which may be executed on the host server and multiplicity of servers include C, C++, C#, Perl, PHP, Python, AppleScript, ColdFusion Ruby, SQL, HTML, and Java.

In the present embodiment, each of local network region 130, local network region 135, local network region 140, and host server 120, may operate to communicate bi-directionally with global network 115 via communication channels 110 and 125 such that the local network regions 130, 135, 140, host server, and global network 115 may operate to communicate with each other and with every other networked device located within game system architecture 100.

In the present embodiment, each remote client 105 of the plurality of remote clients may include a networking device, a processor unit, a GUI and an interface device. Non-limiting examples of devices for the GUI include monitors, televisions, cellular telephones, smartphones and PDAs (Personal Digital Assistants), desktop personal computers (PC)s, laptops, workstations, tablets, gaming console, and media streaming devices. Non-limiting examples of the interface device include pointing devices, touch screens, gesture recognition systems, mouse, trackball, scanner and printer. Non-limiting examples of the network device include gateways, routers, and switches. The networking device may communicate bi-directionally with global network 115, via communication channel 125 and/or 110, and with the processor unit via a data bus. The GUI may receive information from processor unit via the data bus for presentation to a user for viewing. Interface device may operate to send control information to the processor unit and to receive information from processor unit via the data bus.

For example, consider the case where a user interfacing with remote client 105 may want to execute a networked application. A user may enter the IP (Internet Protocol) address for the networked application using the interface device. The IP address information may be communicated to the processor via the data bus. The processor may then communicate the IP address information to the networking device of the remote client via the data bus. The networking device of the remote client may then communicate the IP address information to the global network 115 via communication channel 125. The global network 115 may then communicate the IP address information to a networking device of the host server 120 via communication channel 125. The networking device of the host server may then communicate the IP address information to one of the multiplicity of servers of the game server via a host data bus. The one of the multiplicity of servers may receive the IP address information and after processing the IP address information may communicate return information to the networking device of the host server via the host data bus. The networking device of the host server may communicate the return information to the global network 115 via communication channel 125. Global network 115 may communicate the return information to the networking device of the remote client via communication channel 125. The networking device of the remote client may communicate the return information to the processor via the data bus. The processor may communicate the return information to the GUI via the data bus, wherein, the user may then view the return information on the GUI.

Figure 2:
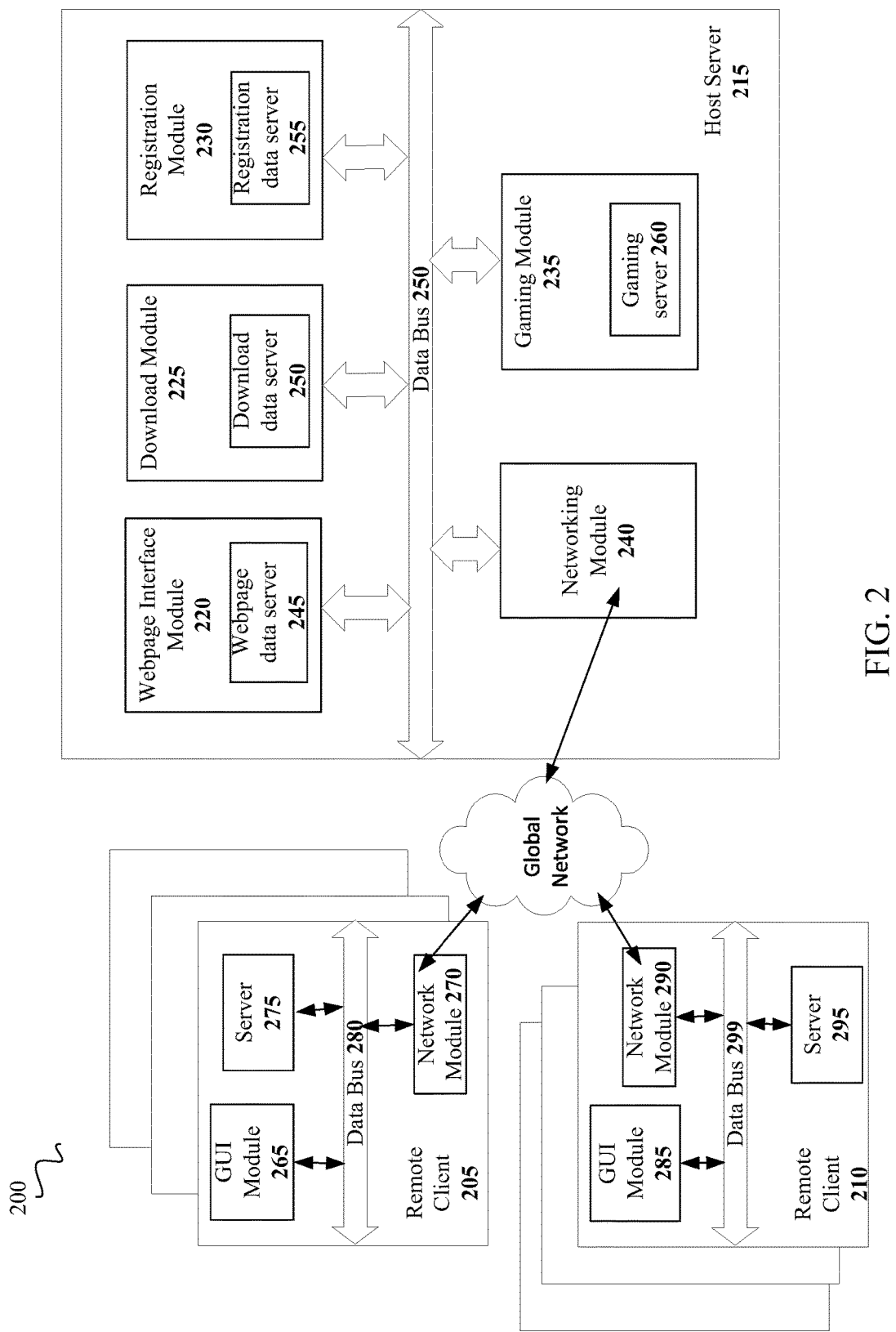
FIG. 2 illustrates an exemplary software module architecture of an interactive game application embodiment, in accordance with an embodiment of the present invention.

FIG. 2 illustrates an exemplary software module architecture 200 of an interactive game application embodiment, in accordance with an embodiment of the present invention. The software module architecture may include a multiplicity of remote clients sampled as a first remote client 205 and a second remote client 210. The software module architecture may further include a host server 215, wherein the host server may include at least a webpage interface module 220, a download module 225, a registration module 230, a gaming module 235 and a networking module 240. Furthermore, the webpage module may include a webpage data server 245. The download module may include a download data server 250. The registration module may include a registration data server 255. The gaming module may include a gaming server 260. In the present embodiment, webpage interface module 220, download module 225, registration module 230, gaming module 235, and networking module 240 may be in communication with each other via a bi-directional data bus 250 which may allow data to be sent between the modules for storage and processing. In the present embodiment, the multiplicity of remote clients may be in communication with host server 215. A first remote client 205 may include a GUI module 265, a networking module 270, a client server 275, and a bi-directional data bus 280, wherein data may be sent between the modules and server of the first remote client for storage and processing via data bus 280. A second remote client 210 may include a GUI module 285, a networking module 290, a client server 295, and a bi-directional data bus 299, wherein data may be sent between the modules and server of the second remote client, for storage and processing, via data bus 299. In the present embodiment, networking modules 240, 270, and 290 may operate to execute computer-readable instructions to access a global network and communicate bi-directionally with each other. In the present embodiment all of the modules of the architecture may execute computer-readable instructions to perform different method steps, in accordance with an embodiment of the present invention. In an alternative embodiment a bi-directional data bus may include the internet or a wireless transmission of data.

Figure 3:
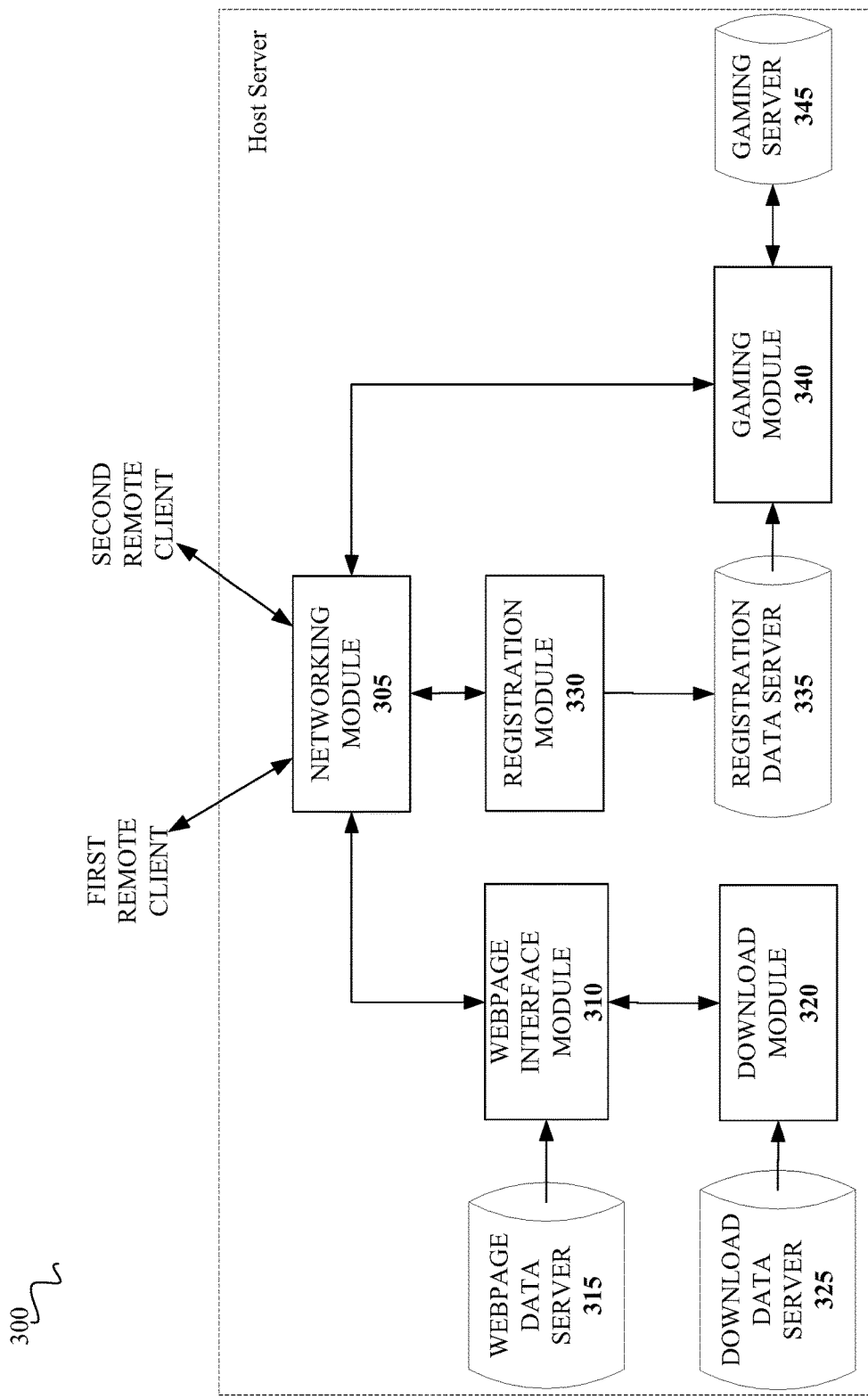
FIG. 3 illustrates an exemplary software module diagram of an interactive game application embodiment, in accordance with an embodiment of the present invention.

FIG. 3 illustrates an exemplary software module diagram 300 of an interactive game application embodiment, in accordance with an embodiment of the present invention. In the present embodiment, a networking module 305, of a host server, may be configured to include executable computer-readable instructions to receive and process a website address request from a remote client via a global network. The network module may also be configured to communicate the request to a webpage interface module 310 of the host server. The webpage interface module may be configured to include executable computer-readable instructions to retrieve webpage data from a storage device of a webpage data server 315, wherein the webpage interface module may further send the webpage data back to networking module 305. The webpage data may include for example, and without limitation, computer-readable instructions to display a webpage, links and other addresses related to the webpage, computer-readable instructions allowing interaction with the webpage, and metadata related to dynamic and static features of the webpage. The networking module may send the webpage data back to the remote client, via the global network. A networking module and a GUI of the remote client may process the webpage data, by executing computer-readable instructions, and may display a usable webpage of an interactive game application to a user of the remote client.

In the present embodiment, webpage interface module 310, of the host server, may also be configured to include executable computer-readable instructions to receive and process a game application download request from the remote client via the global network and networking module 305. The webpage interface module may be configured to communicate the download request to a download module 320 of the host server. The download module may be configured to include executable computer-readable instructions to retrieve game application data from a storage device of a download data server 325. The game application data may include, for example, and without limitation, computer-readable instructions to install game application software, computer-readable instructions to display a multiplicity of screens of a game application, links and other address related to the game application, computer-readable instructions allowing and/or inhibiting interaction with the game application, computer-readable instructions to facilitate entry fields, metadata related to dynamic and static features of the game application, databases of users' contact information, personal information such as a user's birthdate and age, users' registration data, users' personality traits, usage information, users' partner and relationship status information, users' income, payment information, pictures, question categories, advice tips, questions, question answers, compatibility percentages, location information, game status information, continue option, any other game and user related information that may be sent to the users for game facilitation of a game application, in accordance with an embodiment of the present invention or any combination thereof. The download module may also send the game application data back to webpage interface module 310. The webpage interface module may send the game application data back to the remote client, via the global network and networking module 305. The networking module and GUI of the remote client may process the game application data, by executing computer-readable instructions, and may install interactive game software, on a remote client device which may allow an interactive game application to be ran, accessed, and used by a user of the remote client.

In the present embodiment, a user may load the installed interactive game software on a remote client to run an interactive game application that may be used by the user. Furthermore, a user may enter user registration information into the interactive game application and may also send the user registration information with a registration request to the host server. The user registration information may include, without limitation, one or any combination of, a username, a user's first and last name, a user's birthdate, age, a social security number, payment information, an email address, contact information, a permanent residence address, a current location, a user's picture, a password, an answer to a predetermined question, or any other personal information for user authentication. A registration module 330, of the host server, may be configured to include executable computer-readable instructions to perform a user registration. The registration module may be configured to receive and process user registration information and a user registration request from the remote client via the installed interactive game software, global network and networking module 305 and may further be configured to include executable computer-readable instructions to store the user information in a storage device of a registration data server 335.

In the present embodiment, a user may also enter sign-in information in a running interactive game application, on a remote client, being used by a user, to gain further access to features and functionalities of the interactive game application. Sign-in information may include one or any combination of, for example, and without limitation, a username, an email address, contact information, a password, a security answer to a predetermined question, an age, a birth date or any of the registration information described above. Furthermore, a user may send the sign-in information and a sign-in request to the host server. A gaming module 340, of the host server, may be configured to include executable computer-readable instructions to perform a user sign-in operation. The gaming module may be configured to receive and process user sign-in information and a user sign-in request from the remote client via the installed interactive game software, a global network, and networking module 305. The gaming module may further be configured to include executable computer-readable instructions to access a storage device of the registration data server 335. The gaming module may also execute a first look-up by comparing stored registration information with the sign-in information. A successful comparison may allow the user further access to features and functionalities of the interactive game application.

In the present embodiment, a first user may enter a second user's user information in a running interactive game application, on a first remote client, being used by the first user, to invite a second user to play an interactive game application. Second user's user information may include one or any combination of, for example, and without limitation, a username, an email address, or contact information. Furthermore, a first user may send the second user's user information and an invite request to the host server. A gaming module 340, of the host server, may be configured to include executable computer-readable instructions to perform a second user invite. The gaming module may be configured to receive and process the second user's user information and the invite request from the first remote client via the installed interactive game software, a global network and networking module 305. The gaming module may further be configured to include executable computer-readable instructions to access a storage device of the registration data server 335 and may execute a second look-up by comparing stored registration information with the second user's user information. A successful comparison may cause gaming module 340 to generate a play option message. The gaming module may be further configured to include executable computer-readable instructions to send the play option message and at least one portion of a first user's registration information, via a global network and networking module 305, to a second remote client, wherein a second user, using the second remote client, may view the at least one portion of the first user's registration information and also respond to the play option message using a running interactive game application installed on the second remote client. In the present embodiment the play option message may include an option to play the interactive game application with the first user. An unsuccessful comparison may cause gaming module 340 to generate a register message. The gaming module may be further be configured to include executable computer-readable instructions to send the register message and at least one portion of a first user's registration information, via a global network and networking module 305, to an email address of the second user, wherein the second user, using the second remote client, may view the at least one portion of the first user's registration information and also respond to the register message using any well-known conventional email services. In the present embodiment the register message may include a link or address for the second remote client to gain access to a webpage interface module 310. The message may further include instructions to download an interactive game application data and perform a second user registration and sign-in.

In the present embodiment, a second user, using a second remote client, may accept a game with a first user, using a first remote client, by selecting a positive option in a play option message that may be presented to the second user in an interactive game application running on the second remote client. A positive option may include for example, and without limitation, a "yes", an "agree", a "start", a "go", a "play" or any other positive option that may indicate that a second user may desire to play the game with the first user. A gaming module 340 of the host server, may be configured to include executable computer-readable instructions to receive and process the positive option, via a global network and networking module 305. The gaming module may further be configured to include executable computer-readable instructions to commence and carrying out a game session by retrieving game application data from a storage device of a gaming server 345. The game application data may include, for example, and without limitation, computer-readable instructions to display a multiplicity game application screens, computer-readable instructions allowing interaction with the game application, metadata related to dynamic and static features of the game application, a responding user determination, question categories, advice tips, questions, question answers, compatibility percentages, location information, game status information, a continue game option, users' personality traits, usage information, users' partner and relationship status information, or any other game and user related information that may be sent to the users during game facilitation of a game application. Gaming module 340 may further be configured to include executable computer-readable instructions to communicate first particular portions of the game application data to both the first remote client and the second remote client almost simultaneously, via the global network and networking module 305. The particular portions of the game application data may be, for example, and without limitation, display screen data, one or more question categories, one or more questions, one or more answers to questions, one or more advice tips, compatibility percentages, a game status, a continue option, executable computer-readable instructions to allow each remote client to progress through the interactive game application, and any combination thereof. The gaming module may further be configured to include executable computer-readable instructions to communicate second particular portions of the game application data to both the first remote client and the second remote client, almost simultaneously, in response to receiving feedback from the first remote client and the second remote client. The gaming module may communicate a multiplicity of particular portions of the game application data to both the first remote client and the second remote client, almost simultaneously, during the game session. The gaming module may also be configured to end a game session when feedback from at least one of the remote clients may not be a positive response to a "continue game" option.

In some alternative embodiments, a registration module may communicate a registration success, a registration failure, or an already registered message back to a remote client, via networking modules and a global network, wherein a user may be required to reenter or change user information. In some alternative embodiments a registration message may include a decline option. In another alternative embodiment a registration message may include first user information such as, a name, username, picture, residence address, current location, income, and descriptive personal data such as, age, ethnicity, height etc., wherein the first user information may be displayed to the second user. In some alternative embodiments, a gaming module may communicate a sign-in success, a sign-in failure, or a not registered message back to the remote client, via networking modules and a global network, wherein a sign-in failure message may be sent in response to a partial comparison and a not registered message may be sent in response to a completely unsuccessful comparison. Furthermore, a user may be required to reenter sign-in information, change sign-in information, or submit registration information. In some alternative embodiments a sign-in may include processing a payment. In other alternative embodiments a sign-in may include processing a payment after a predetermined number of free sign-ins. In another alternative embodiment, sending a download request may include processing a payment. In some alternative embodiments a sign-in may include submitting a current location, wherein the current location may be stored and not used for a sign-in comparison. In some alternative embodiments a user may perform a registration off-line by registering the user information, via a running interactive game application, in a database downloaded during a download of interactive game application data. In some embodiments a user may perform a sign-in, off-line by entering sign-in information, via a running game application, wherein executable computer-readable instructions of the game application, downloaded during a download of interactive game application data, may perform a comparison with an off-line registration database. In another alternative embodiment, a game session between two remote clients may be facilitated without a host server. Both of the remote clients may run previously downloaded interactive game application software and game application data, wherein the software may be executed to perform a game session using a network that would allow direct communication between the two remote clients. In yet another alternative embodiment, some game related functions may be performed using a host server while other functions may be performed by downloaded interactive game application software. In another alternative embodiment, an interactive game application installed in a remote client may be updated by the host game server. In many alternative embodiments, an invite request, first user information, and second user information, submitted by a first remote client, may be stored in a temporary storage device on a host server in response to an unsuccessful comparison of the second user information with stored registration information. After a second user downloads the game application data and registers user information, a play option message may be sent automatically from the host server to a second remote client. In some alternative embodiments an invite request, first user information, and second user information, submitted by a first remote client, may be stored in a temporary storage device on a host server in response to an unsuccessful comparison of the second user information with stored registration information. After a second user downloads the game application data and registers user information, a notification, indicating that the second user has registered, may be sent automatically from the host server, to the first remote client.

In some alternative embodiments, a server, in accordance with an embodiment of the present invention, may comprise a multiplicity of servers, mainframes, mini servers, or application servers. In some alternative embodiment at least one local network region, in accordance with an embodiment of the present invention may comprise a multiplicity of remote clients.

Figure 4A:
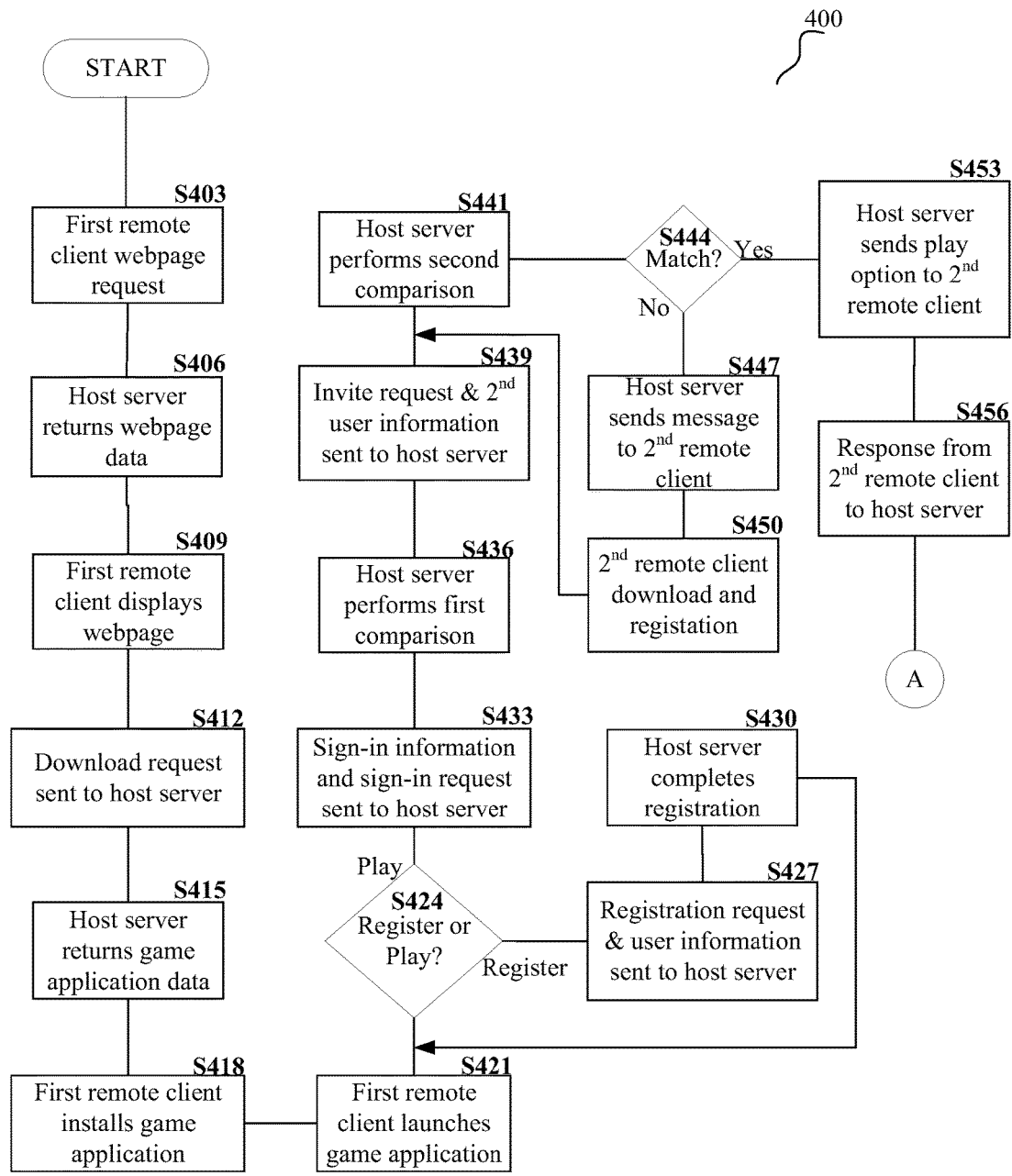
FIG. 4A and FIG. 4B illustrates an exemplary software processing flowchart of an interactive game application embodiment, in accordance with an embodiment of the present invention, where
Figure 4B:
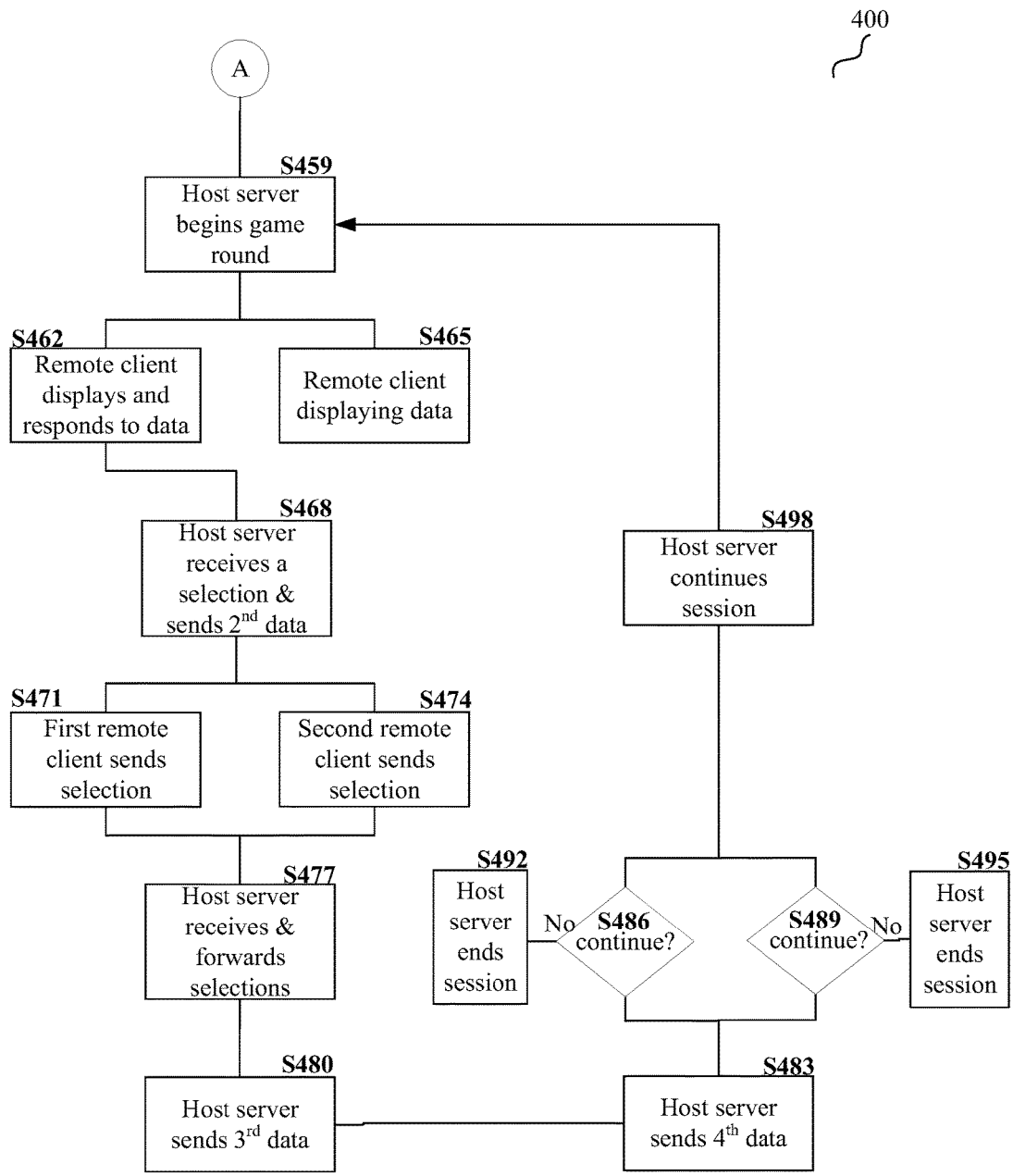

Now with reference to FIG. 3, FIG. 4A, and FIG. 4B an exemplary, without limitation, software processing of an interactive game application embodiment may be described in some detail below. FIG. 4A, illustrates a start of an exemplary software processing flowchart of an interactive game application embodiment, in accordance with an embodiment of the present invention, and FIG. 4B illustrates an end thereof. The processing may begin with a first user, using a first remote client to possibly request a webpage address from a host server in a step 403. The host server, in operable communication with a webpage interface module, may receive the request and may return webpage data of the interactive game application, in a step 406, to the first remote client. In a step 409, the first remote client may execute computer-readable instructions to cause a GUI of the first remote client to display a webpage of the interactive game application. The first user, operating the first remote client, may then request to download interactive game application software via the webpage in a step 412. The host server, in operable communication with a download module, may return interactive game application data to the first remote client, in a step 415. Next, in a step 418, the first remote client may execute computer-readable instruction to install the returned interactive game application data. The installed application data may allow the interactive game application to be launched and ran in a step 421, on the first remote client. After running the interactive game application, the first user may choose to perform a registration in a decision step 424. Registration may be performed by the first user entering first user information and submitting a registration request, in a step 427, to the host server, wherein, entering the first user information and submitting the registration request may be performed in the running interactive game application installed on the first remote client. The host server, in operable communication with a registration module, may store the first user information and thus complete a registration in a step 430. Next, the first user may choose to play the interactive game application back at the decision step 424. After choosing to play, the first user may perform a sign-in. The first user may enter first user sign-in information and send a sign-in request to the host server in a step 433, wherein entering the first user sign-in information and sending the sign-in request are performed in the running interactive game application installed on the first remote client. The host server, in operable communication with the registration module, may perform a first comparison, in a step 436, to possibly verify a match between the first user sign-in information and previously stored registration information. After a successful sign-in, the first user may enter a second user's user information, wherein a second user may be another remote user that the first user may desire to play the interactive game application with. The first user may submit an invite request and the second user's user information to the host server in a step 439, wherein submitting the invite request and second user's user information are performed in the running interactive game application installed on the first remote client. The host server, in operable communication with a gaming module, may perform a second comparison, in a step 441, to possibly verify a match between the second user's user information and previously stored registration information. Next, at a decision step 444, the gaming module determines if a match has been found. If no match has been found the gaming module may send a register message, in a step 447, to a second remote client, using first user information and the second user's user information, wherein the register message communicates that the first user may desire to play the interactive game application and that the second user may need to download the interactive game application and perform a registration and a sign-in. In a step 450, a second user may download the interactive game application data and perform a registration and sign-in, wherein the second user may download the interactive game application, register second user information, and sign-in to the interactive game application by performing similar steps as described in steps 403-436. The gaming module may then perform another comparison back in the step 441 to possibly verify a match between the second user information and previously stored registration information, wherein the previously stored registration information may have been updated by the registration of the second user. Furthermore, in a case that the second user was already registered, only 1 comparison may be needed at step 441. If a match has been found, the gaming module may send a play option message to the second remote client, using first user information and the second user's user information, in a step 453, wherein, the play option message may present an option to the second user to play the interactive game application with the first user. The second user may choose to play. The second user may operate the second remote client, running an interactive game application, to send a positive response, in response to the play option message, to the host game server, in a step 456. Next, the host server, in operable communication with the gaming module, may begin an interactive game application session and start a first round by sending a portion of interactive game application data to both the first remote client and the second remote client, simultaneously, in a step 459. The first portion of interactive game application data may allow both the first remote client and the second remote client to display the sent first portion of interactive game application data. Furthermore, the first portion of interactive game application data may also allow only one of the users to enter and send a response to the host server, via a remote client. A responding user, may respond to a displayed portion of interactive game application data, by operating a remote client to send feedback to the host server, in a step 462, wherein the responding user may be the first user or the second user, moreover, the feedback may include a selection from a either a responding first user or a responding second user. A non-responding user may only view the portion of interactive game data being displayed by a remote client, in a step 465, and may not have the ability to submit a response via the remote client at this time. Next, the host server, in operable communication with the gaming module, may receive the feedback and send a second portion of the interactive game application data to both the first remote client and the second remote client, simultaneously, in a step 468. The second portion of the interactive game application data may allow both the first remote client and the second remote client to display the sent second portion of interactive game application data. Furthermore, the second portion of interactive game application data may also allow both users to enter and send feedback to the host server via their respective remote clients. The first user may make a first user selection in response to the second portion of interactive game application data, and send the selection to the host server, using a first remote client, in a step 471. Also, the second user may make a second user selection in response to the second portion of interactive game application data, and send the second user selection to the host server, using a second remote client, in a step 474. Next, the host server, in operable communication with the gaming module, may receive the first user selection and the second user selection. The host server may then forward the first user selection to the second remote client, and simultaneously may forward the second user selection to the first remote client, in a step 477. Forwarding the selection may allow each user to view the other user's selection. After each user views the other user's selection, the host server, in operable communication with the gaming module, may send a third portion of interactive game application data to both the first remote client and second remote client, simultaneously, in a step 480. The third portion of the interactive game application data may allow both the first remote client and the second remote client to display the sent third portion of interactive game application data. Furthermore, the third portion of interactive game application data may not allow either users to enter and send a response to the host server. After each user views the third portion of the interactive game application data, the host server, in operable communication with the gaming module, may send, a fourth portion of interactive game application data to both the first remote client and second remote client simultaneously in a step 483. The fourth portion of the interactive game application may include a continue option. In a case that the first user may choose not to continue, the first user may operate the first remote client to send a negative response to the host server in a decision step 486. In a case that the second user may choose not to continue, the second user may operate the second remote client to send a negative response to the host server in a decision step 489. The host server, in communication with the gaming module, may receive one or more negative response and end the interactive game application session in a step 492 and/or in a step 495, such that a negative response to the continue option from either user or both users may end the interactive game application session. In a case that both the first and second users may choose to continue, both the first and second remote clients may be operated to send a positive response to the host server in the decision step 486 and the decision step 489. The host server, in communication with the gaming module, may receive the positive responses and may continue the interactive game application session, in a step 498 by cycling the processing back to the step 459 and executing a second round. In the present embodiment, the gaming module may be configured to include executable computer-readable instructions to choose which user may be the responding user to the first portion of interactive game application data. The gaming module may further be configured to show both user's user information of the chosen responding user by displaying the responder's user information on the first and second remote clients. For example, and without limitation, the gaming module may display that a username, of the chosen responding user, may be making a response/selection. Furthermore, the gaming module may also be configured to alternate which user may be the chosen responding user with each round that may be played. In the present embodiment, a multiplicity of rounds may be executed. In another embodiment, after a host server may receive one or more negative responses in response to a continue option, the host sever may send a share option to the first and second remote clients, wherein each user may choose to have their email addresses, cell phone numbers, names or social media contact info displayed to the other remote client for direct contact via a cellular network, a global network, and/or a social media site.

In many alternative embodiments a signed-in first user may view a list of usernames of other registered users. Furthermore, the signed-in user may also see some registered users' user information such as, and without limitation, a current location, residence location, and a picture, wherein a signed-in user may select a registered user from the viewed list to send an invite to. Furthermore, other registered user information may further include a mobile number, wherein an invite message may be sent to the second user via text message over a cellular network.

In many alternative embodiments user registration may include a selectable option to share user registration information with other users, wherein all of or just portions of the user information may be designated as sharable or not sharable. In another alternative embodiment a user may select a language to play an interactive game application in.

In many alternative embodiments, a gaming module may determine that the user who sent an invite request may be the responding user to the first portion of interactive game application data. In some alternative embodiments a gaming module may determine that the user who received a registration message (an invited user) may be the responding user to the first portion of interactive game application data. In some alternative embodiments a responding user may be chosen alphabetically. In another alternative embodiment a gaming module may be configured to determine a first or second user to be a responding user to the first portion of interactive game application data by random selection using a random number generator. In another alternative embodiment, after a responding user may be chosen by randomly selecting a first or second user for a first game round, a different responding user may be chosen for each following round, wherein, in each round the responding user may be chosen by alternating between the users. In another alternative embodiment a responding user may be randomly selected for each game round. In yet another alternative embodiment a selected responding user may be the responding user for each game round until the game sessions have ended. In other alternative embodiments, a selected responding user may change only after a predetermined number of rounds may have been played. In another alternative embodiment, a selected responding user to a first portion of interactive game application data may change in a following round only if user responses to a second portion of interactive game application are different. In another alternative embodiment, a selected responding user to a first portion of interactive game application data may change in a following round only if user responses to a second portion of interactive game application are the same.

In yet another alternative embodiment, after a select responding user responds to a first portion of interactive game application data, a host server may present the responding user with an option to proceed normally or provide an open message. An open message may include the responding user creating a question and corresponding multiple choice answers that the host server will send as a second portion of interactive application data. Furthermore, the host server, may store the open message for use with future users.

In many alternative embodiments after a host server forwards user selections in response to a second portion of interactive game application data, the host server may allow a predetermined amount of time to elapse before a third portion of interactive game application data may be sent to a first and second remote clients. In many alternative embodiments after a host server may send a third portion of interactive game application data to a first and second remote clients, the host server may allow a predetermined amount of time to elapse before a fourth portion of interactive game application data may be sent to a first and second remote clients. In some alternative embodiments a third portion of interactive application data may further include a compatibility percentage based on an accumulation of responses by the users that are the same. In yet another alternative embodiment a third portion of interactive application data may further include a dynamic graphic which changes based on a compatibility percentage, where in the graphic may include, for example, and without limitation, pieces on a game board which move closer together as a compatibility percentage increase and vis-versa, or a heart that becomes more filled as a compatibility percentage increases and vise-versa. In another alternative embodiment, when a first and/or second user may choose to end an interactive game session, the host server may send a message to the other user, wherein the message may include an indication that the "username" of the user choosing to end the session "has ended the session".

In yet another alternative embodiment, a user registration may include creating a user profile, wherein in response to portions of interactive game application data may be stored for each profile. Furthermore, users may exchange direct messages that may be stored with the user profile. After a user sign-in a host game server may present a user with an option to view any messages that may have been sent to the user by another user.

In another alternative embodiment, a host game server may further be configured to execute a suggested invitation. After a first user sign-in, the host game server may present a suggested invitation option, wherein, if selected by the first user, the host game server may provide a list of usernames for invite. The host game server may provide usernames of user that are for example, without limitation, in a similar location, have residence address in close proximity, have similar personality traits, have similar responses to portions of interactive game application data, or any combination thereof.

In another alternative embodiment, a host game server may further be configured to execute an open invitation request. After a first user sign-in, the host game server may present an open invitation option, wherein, if selected by the first user, may cause a first remote client may send an open invitation request to the host server. The host server may store the open invitation request and later display a play open invitation option to other users so that after a second user sign-in, the second user may be presented to play a game session with the first user by responding positively to the play open invitation option. The play open invitation option may be presented to a multiplicity of users until a user responds positively to the play open invitation option or the first user cancels the open invitation.

Figure 5:
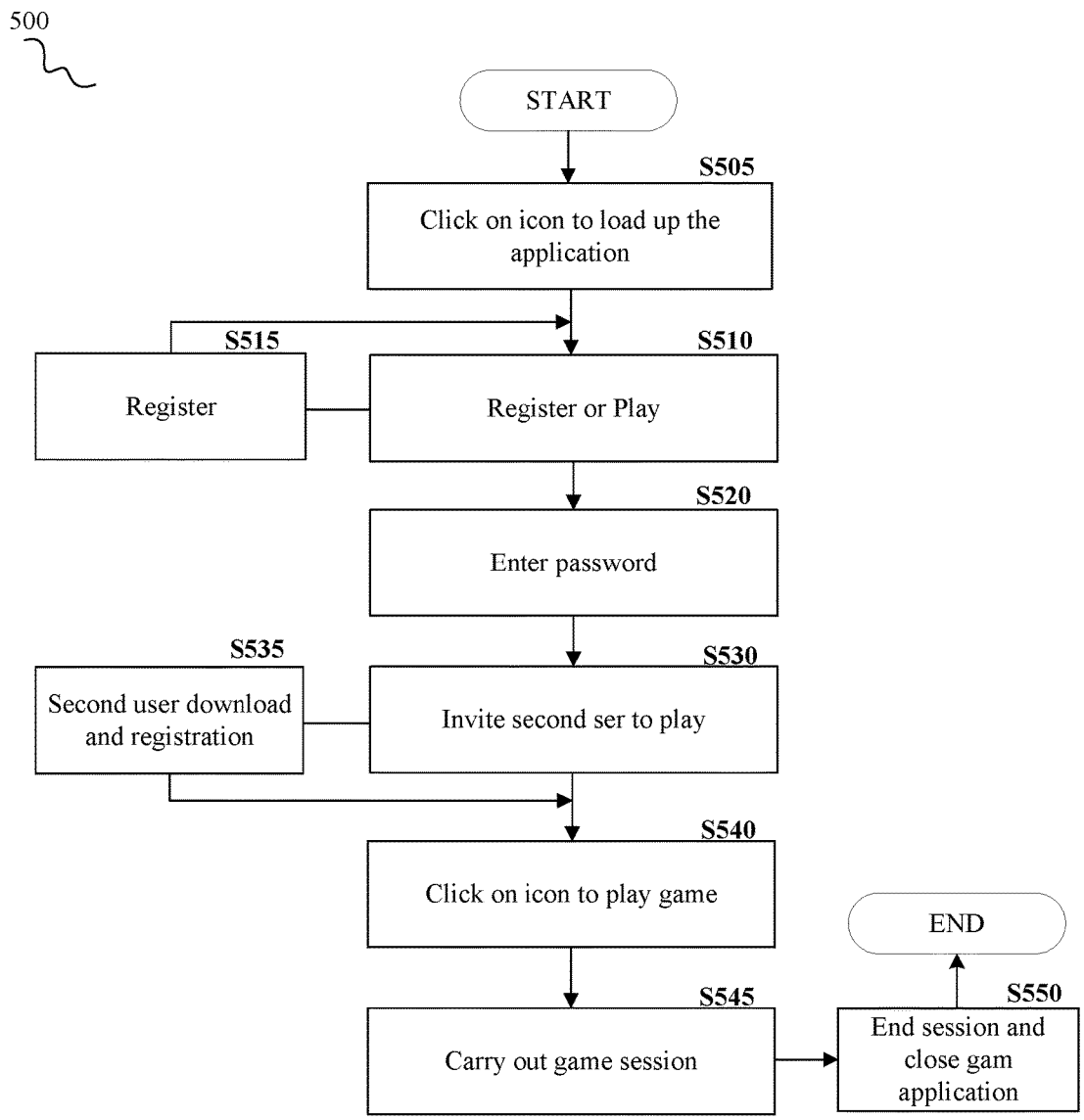
FIG. 5 illustrates a flowchart of an exemplary user sign-in method of an embodiment of an interactive game application, in accordance with an embodiment of the present invention.

FIG. 5 illustrates a flowchart of an exemplary user sign-in method 500 of an embodiment of an interactive game application, in accordance with an embodiment of the present invention. In the present embodiment, once interactive game application data may be downloaded and installed on a first remote client. A game icon may be displayed on the first remote client and clicked on by the first user, in a step 505, for direct entry to the interactive game application. A first user may then choose to play or register in a decision step 510. A first user may be a first time user and thus may need to perform a registration process using a host server in a step 515. A first user may be a returning user and thus may already be register. The first user may choose to play in the decision step 510. Next the first user may then sign-in by entering their email address, username and/or password, in a step 520. After a successful comparison may be performed by the host server, a process of inviting a second user to play the interactive game application, may be started, in a step 525. The first user may invite a second user by entering the second user's email address or username into the first remote client in a step 530. When an invitation request may be submitted by the first remote client, the host server may send a message to a second remote client by using the second user's email address requesting the second user to play. The second user may be a first time user and thus may need to perform a download the interactive game application data, install the interactive game application, and perform a registration process using the host server in a step 535. Once the second user is registered, the second user may accept the invitation to play by clicking on a "play game" icon displayed in the interactive game application on the second remote client, in a step 540, wherein clicking the "play game" icon submits a request to the host server to begin an interactive game session. The host server may then carry out a game session, in a step 545, by sending a multiplicity of interactive game application data to each remote client and recording first and second user response from the first and second remote clients. The game session may end and the interactive game applications may be closed, in a step 550 when a response from either user may be a negative response to a sent continue option. In another embodiment an interactive game application may be played by a multiplicity of users using a multiplicity of remote clients, wherein a first user may enter a multiplicity of email addresses or usernames when submitting an invite request. Furthermore, the host server may be configured to send interactive game application data to the multiplicity of remote clients simultaneously.

In many embodiments, in accordance with the present invention, an interactive game application may include an interactive compatibility game application. It may be contemplated that the interactive compatibility game application may assist individuals in obtaining knowledge about a potential dating partner, current dating partner or life partner. It may be further contemplated that many embodiments may provide a fun, safe and non-threatening way to assist individuals in determining if they may be compatible with another individual. In some embodiments, an interactive compatibility game may be played between at least two players who each may use a remote client device, such as, without limitation a cell phone, laptop, a desktop personal computer (PC), workstation, personal, digital assistance device (PDA), tablet, phone, or any other device capable of interfacing via an internet browser or any other communication network thus, the players do not have to be in the same location to play the game together.

Figure 6:
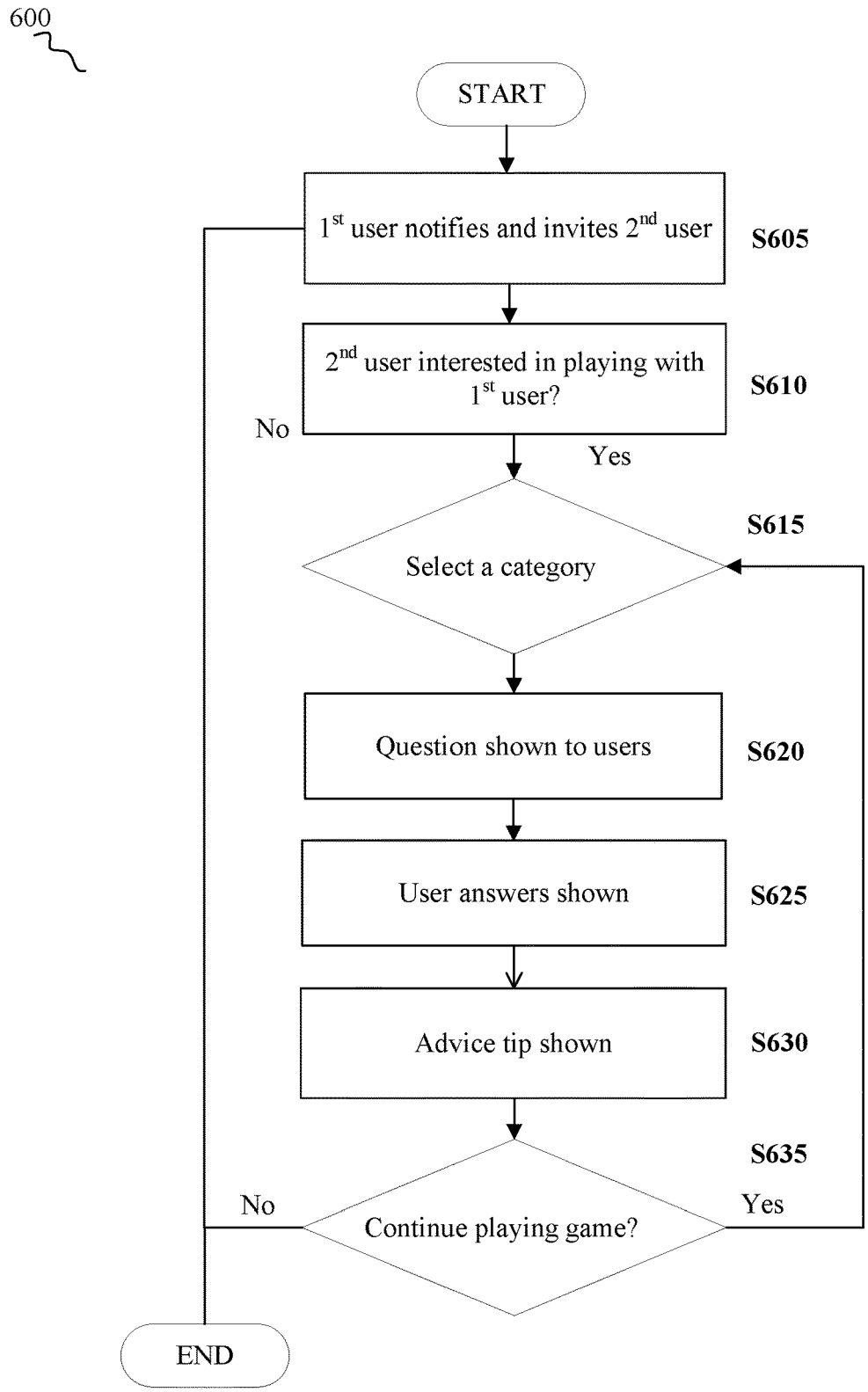
FIG. 6 illustrates a flowchart of an exemplary interactive compatibility game application session, in accordance with an embodiment of the present invention.
Figure 7A:
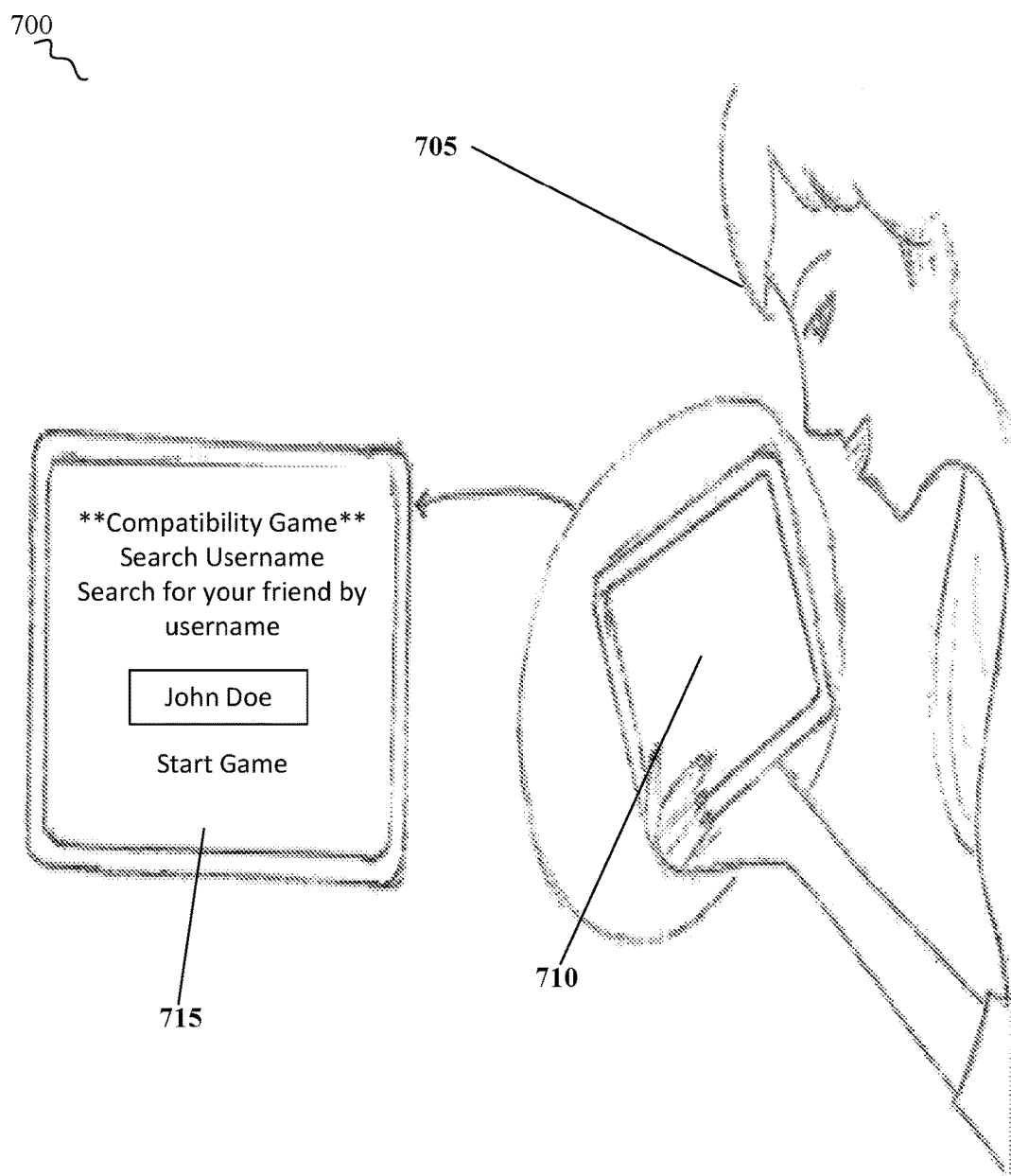
FIG. 7A illustrates an exemplary first remote user starting an interactive game application session embodiment, in accordance with an embodiment of the present invention.
Figure 7B:
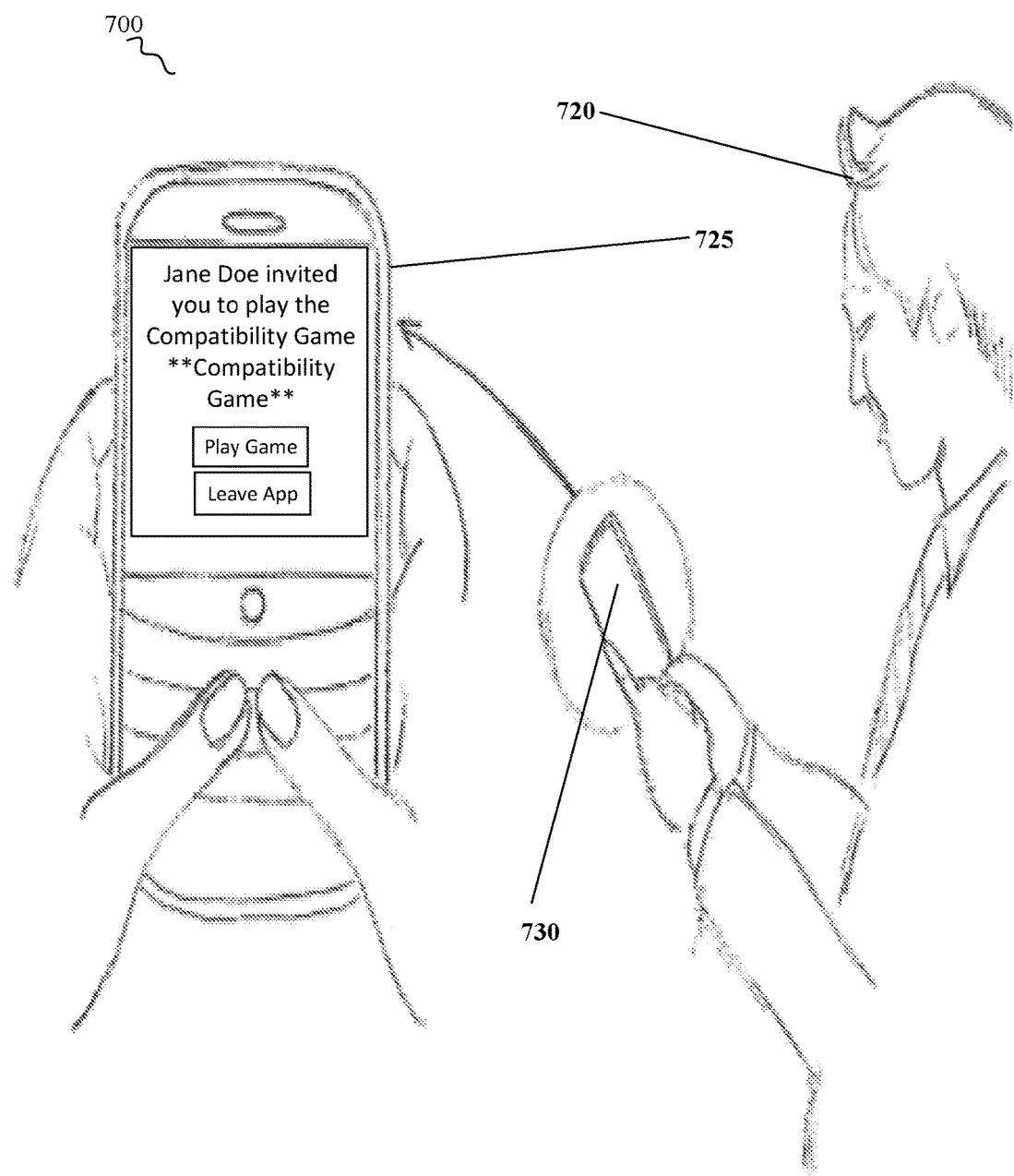
FIG. 7B illustrates an exemplary second remote user responding to an exemplary invite message of an interactive game application session embodiment, in accordance with an embodiment of the present invention.
Figure 7C:
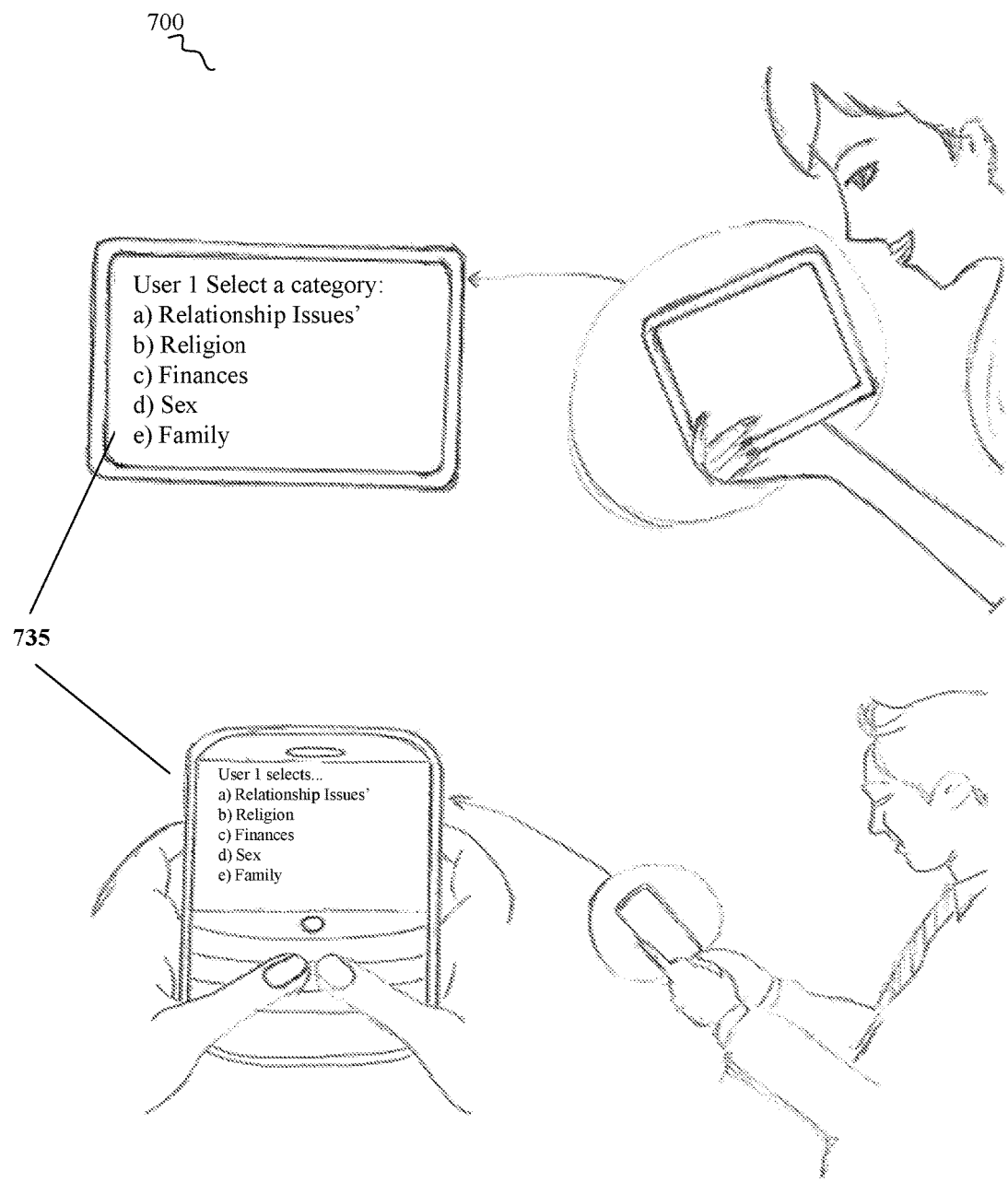
FIG. 7C illustrates an exemplary first and second remote users viewing an exemplary first portion of data in an interactive game application session embodiment, in accordance with an embodiment of the present invention.
Figure 7D:
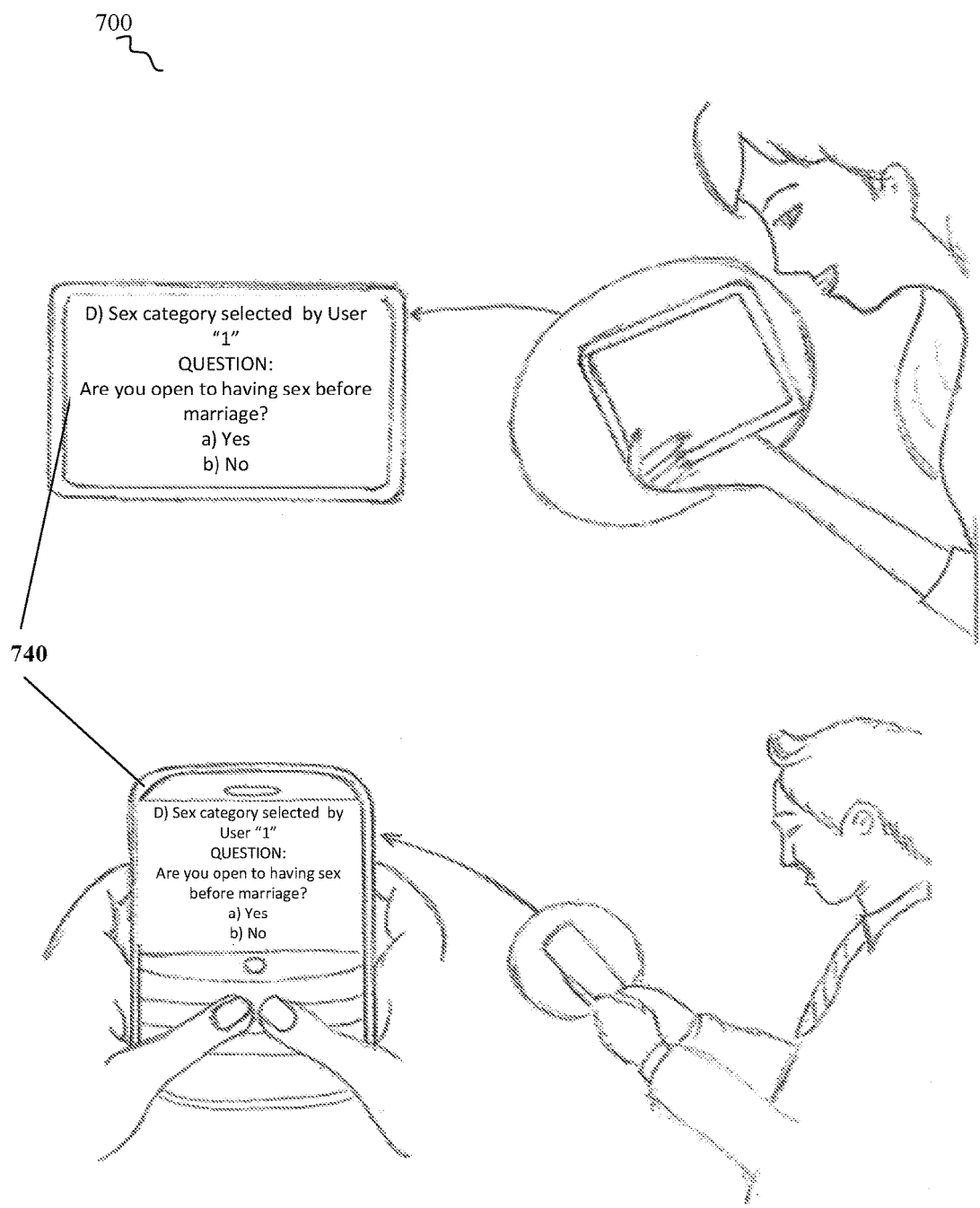
FIG. 7D illustrates an exemplary first and second remote users viewing an exemplary second portion of data in an interactive game application session embodiment, in accordance with an embodiment of the present invention.
Figure 7E:
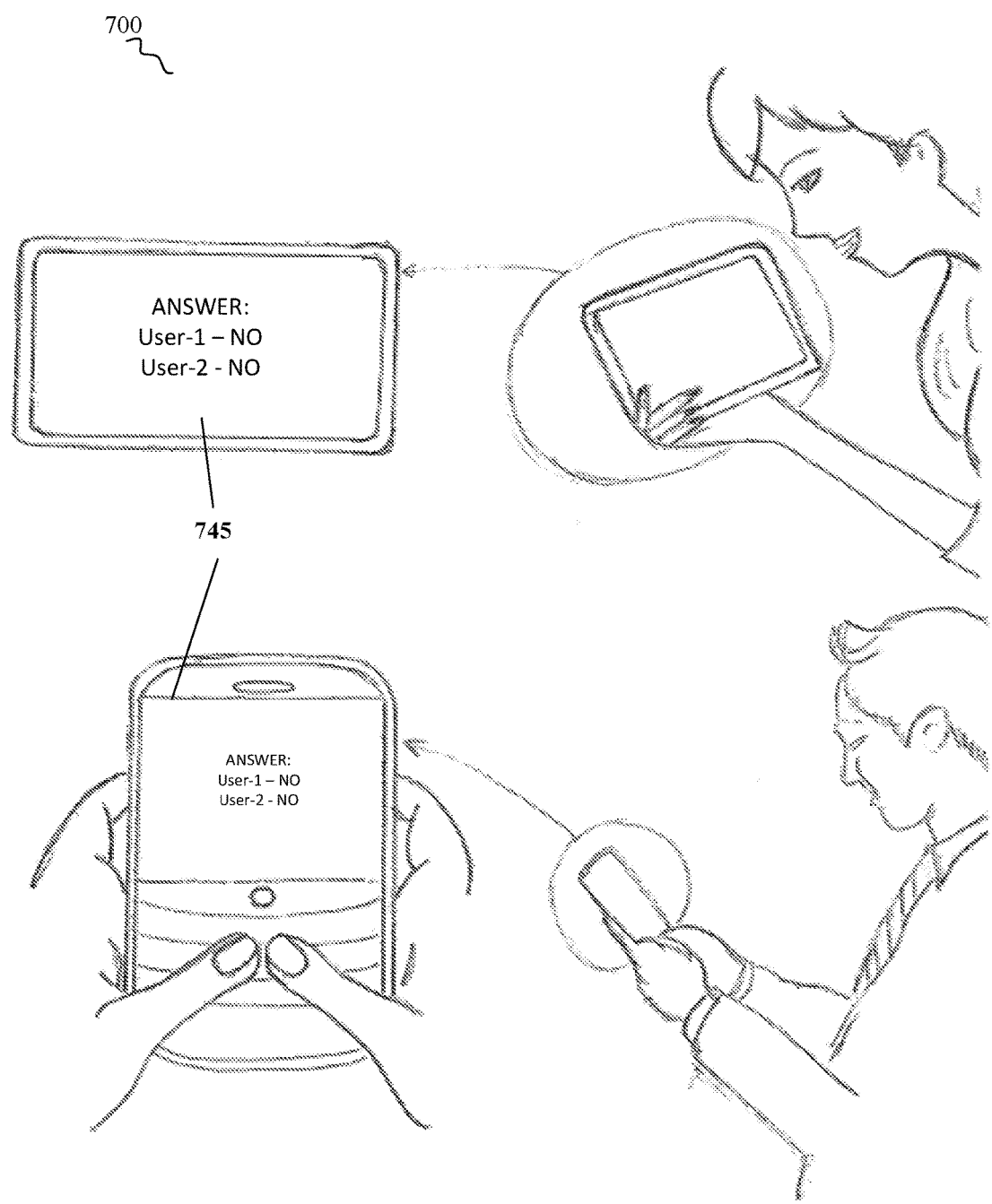
FIG. 7E illustrates an exemplary first and second remote users viewing exemplary forwarded selections in an interactive game application session embodiment, in accordance with an embodiment of the present invention.
Figure 7F:
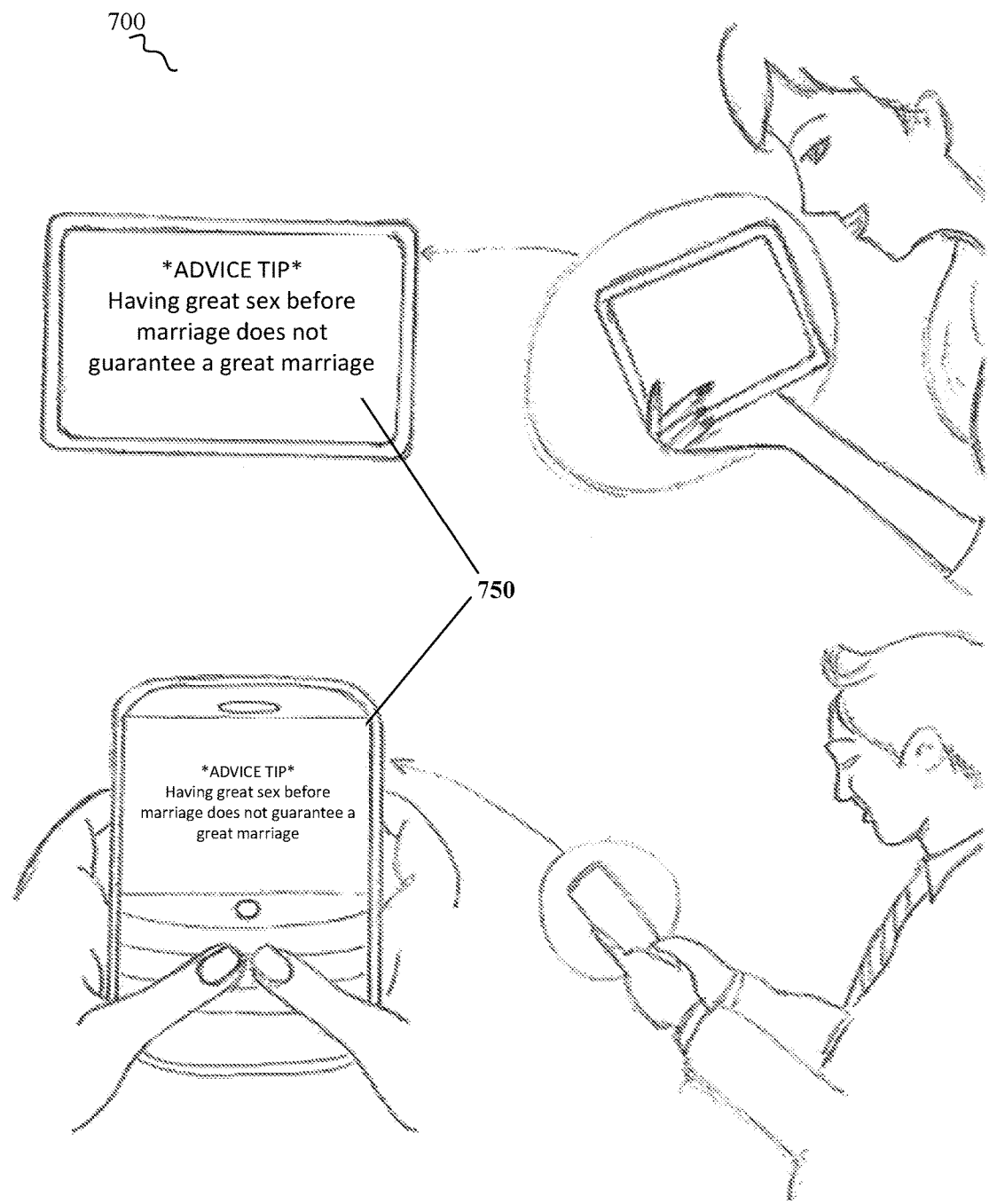
FIG. 7F illustrates an exemplary first and second remote users viewing an exemplary third portion of data in an interactive game application session embodiment, in accordance with an embodiment of the present invention.
Figure 7G:
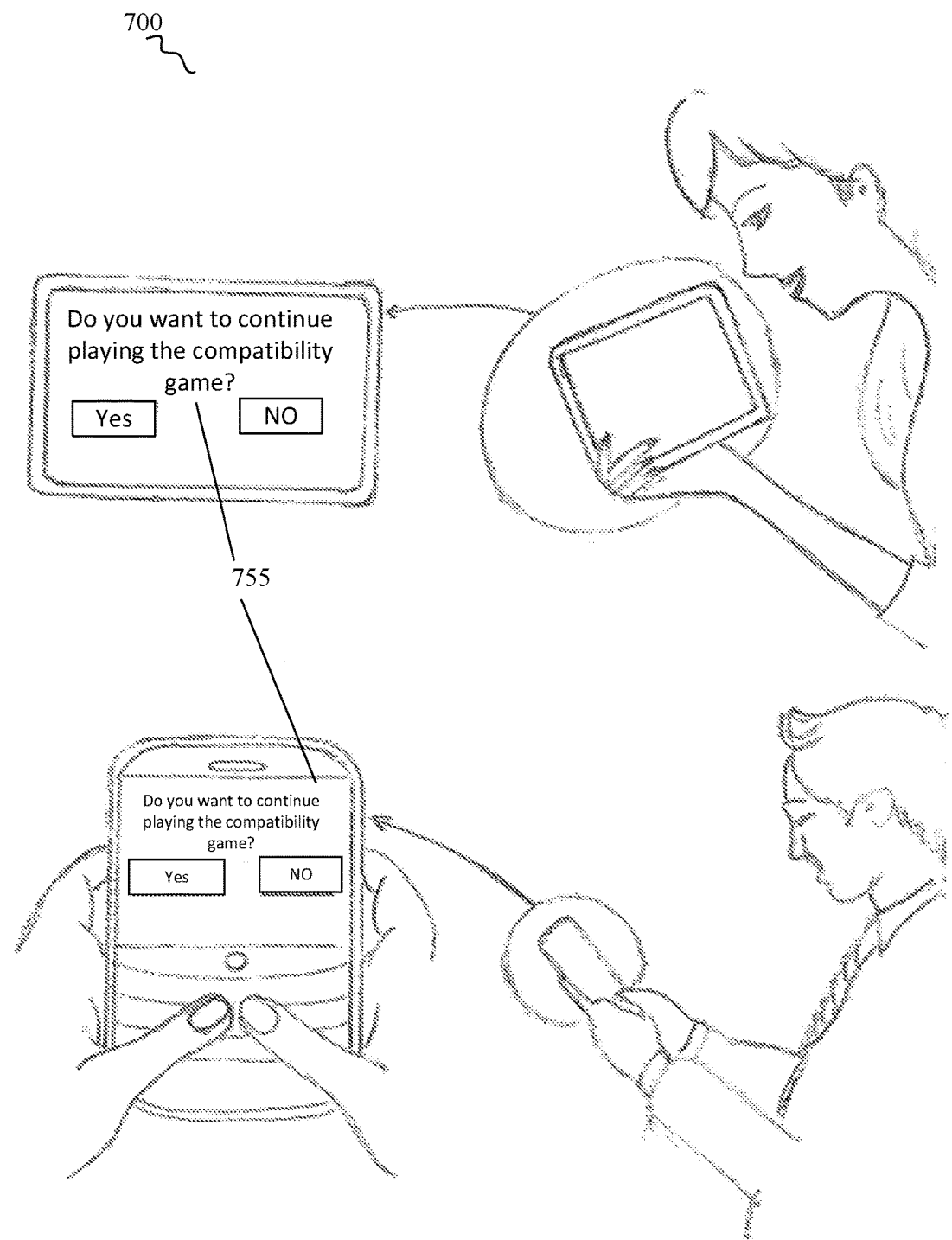
FIG. 7G illustrates an exemplary first and second remote users viewing an exemplary fourth portion of data in an interactive game application session embodiment, in accordance with an embodiment of the present invention.
Figure 7H:
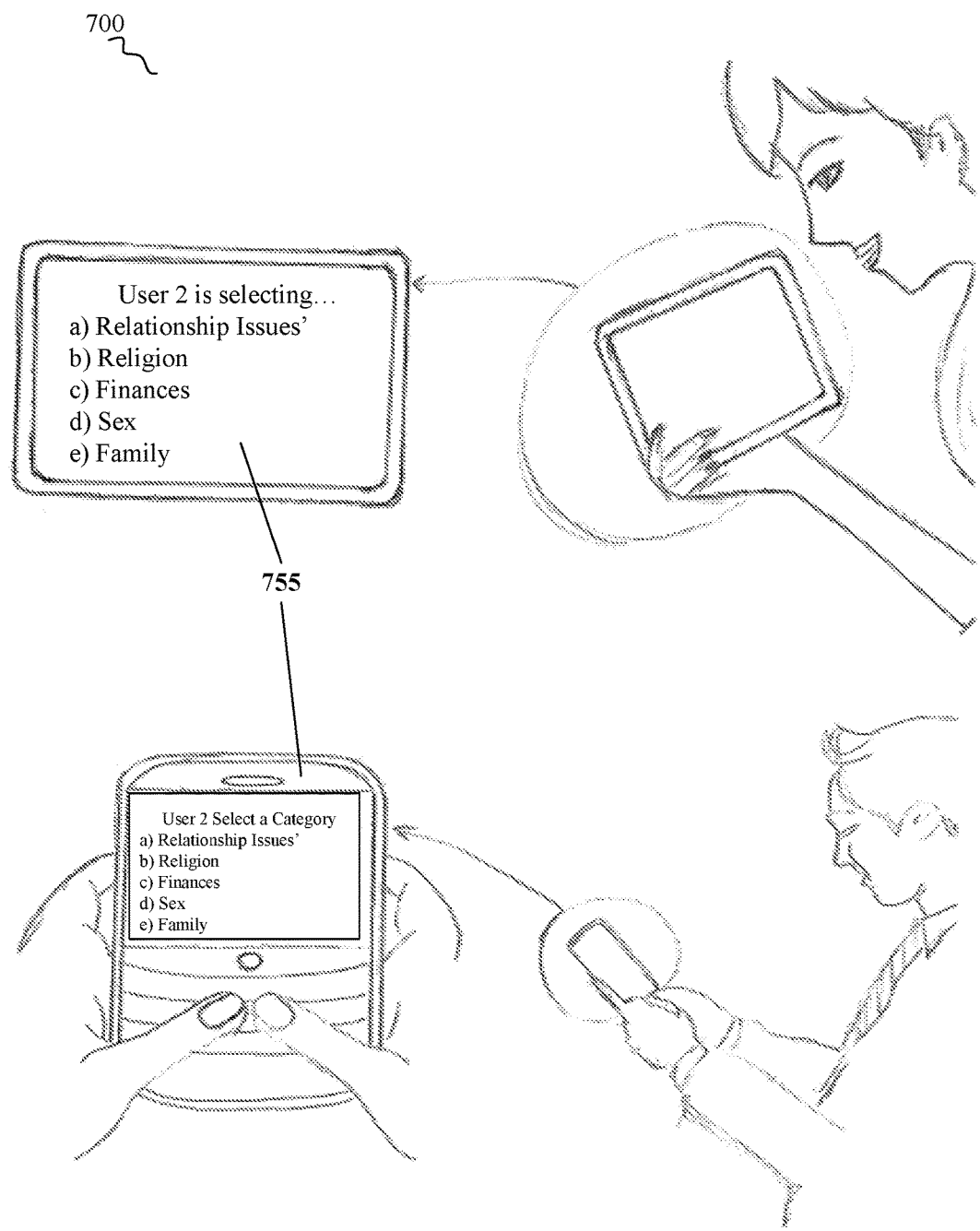
FIG. 7H illustrates an exemplary first and second remote users continuing an exemplary interactive game application session embodiment, in accordance with an embodiment of the present invention.

FIG. 6 illustrates a flowchart of an exemplary interactive compatibility game application session, in accordance with an embodiment of the present invention. Exemplary, without limitation, method steps of the exemplary interactive compatibility game application session will now be described below with reference to FIG. 6 and FIG. 7A through FIG. 7H. In the present embodiment, after a first and second user have installed the interactive compatibility game application on respective first and second remote clients, the first user may notify the second user that they would like to play the interactive compatibility game application, in a step 605, by entering the second user's name and sending an invite message to the second remote client. Next, in a step 610, a second user may view the invite message on the second remote client, and a determination may be made whether the second user desires to play the game with the first user by the second user selecting "play game" or "leave app". If the selection by the second user is negative ("leave app"), the method may end, if the selection by the second user is positive ("Play game") processing may proceed to a step 615. In step 615, a gaming module of the interactive compatibility game application may simultaneously provide both the first remote client and the second remote client with an identical list of categories. The identical list of categories may be directed toward particular subjects including, but not limited to, relationship issues, religion, finances, sex and family. The gaming module may be configured to select which user chooses a category from the identical list of categories by showing their user name on the screen, for example, and without limitation, "Jan doe, select a category", may be displayed. Furthermore, the gaming module may also be configured to alternate the users for category selection such that, for illustrative example, and without limitation, if a first user may have selected a category for a first question round then the second user may select a category for a second question round. Once a category may be selected from the identical list of categories by one of the users, the selected category and an identical question pertaining to subject matter of the selected category, to be answered by the first user and second user individually, may be shown to both users simultaneously by the gaming module in a step 620. The first user and the second user may select and answer the question individually by selecting one of a multiplicity of provided answer choices. After answers may be selected, the gaming module may forward the answers such that, the first user's answer may be provided to the second remote client and the second user's answer may be provided to the first remote client in a step 625. The gaming module may then provide each remote client an advice tip, in a step 630, wherein, the advice tip may be pertaining to the answered question. The advice tip may be relationship advice. An example of an advice tip may be, without limitation "Having great sex before marriage is not a guarantee of a great marriage", wherein the answered question may have been pertaining to sex. In a decision step 635, a determination may be made by a first user and a second user to continue playing the game. If the determination may be negative by either the first user or the second user, the method may end. If the determination may be positive by both the first user and the second user, step 615 may be accessed and steps 620-635 may be repeated. The users may continue cycling steps 615-635 until they may have answered each of the questions in each of the list of categories or until the first user, the second user or both users may make a determination to terminate the game. After all questions are answered by the users, a summary of the questions and answers may be shown to both users for their review. FIG. 7A through FIG. 7H each illustrate exemplary stages of the described game session. FIG. 7A illustrates an exemplary first user 705 starting an interactive game application session 700, in accordance with the present embodiment of the present invention, wherein the first user may use a first remote client 710 to access the interactive compatibility game application 715. FIG. 7B illustrates an exemplary second remote user 720 responding to an exemplary invite message 725 of the interactive game application session embodiment, in accordance with the embodiment of the present invention, using a second remote client 730. FIG. 7C illustrates an exemplary first and second remote users viewing an exemplary first portion of data 735 in an interactive game application session embodiment, in accordance with the embodiment of the present invention, wherein the first portion of data may include an identical category list and a responding user identification displayed by the first remote client and second remote client. FIG. 7D illustrates exemplary first and second remote users viewing an exemplary second portion of data 740 in an interactive game application session embodiment, in accordance with an embodiment of the present invention, wherein the second portion of data may include a selected category and identical questions displayed by the first remote client and second remote client. FIG. 7E illustrates an exemplary first and second remote users viewing exemplary forwarded selections 745 in an interactive game application session embodiment, in accordance with the present embodiment of the present invention, wherein the forwarded selections may include other user answers to a previously displayed question. FIG. 7F illustrates an exemplary first and second remote users viewing an exemplary third portion of data 750 in an interactive game application session embodiment, in accordance with the present embodiment of the present invention, wherein the third portion of data may include an advice tip. FIG. 7G illustrates an exemplary first and second remote users viewing an exemplary fourth portion of data 755 in an interactive game application session embodiment, in accordance with the present embodiment of the present invention, wherein a fourth portion may include a continue option. FIG. 7H illustrates an exemplary first and second remote users continuing an exemplary interactive game application session embodiment, in accordance with the embodiment of the present invention. Also referring again to FIG. 6, and FIG. 7C in the present embodiment, when the method cycles back to step 615, a different user may be selected as the category selecting user 755 with respect to a previous category selecting user, see FIG. 7C.

It may be contemplated by those skilled in the relevant art, in light of the teaching of the present invention, the methods may be adapted for the purposes other than romantic relationships. For instance, those skilled in the art, in light of the teachings of the present invention would readily recognize that user looking for suitable business relationships, friendships, roommates, caretakers, and etc. may play.

Figure 8:
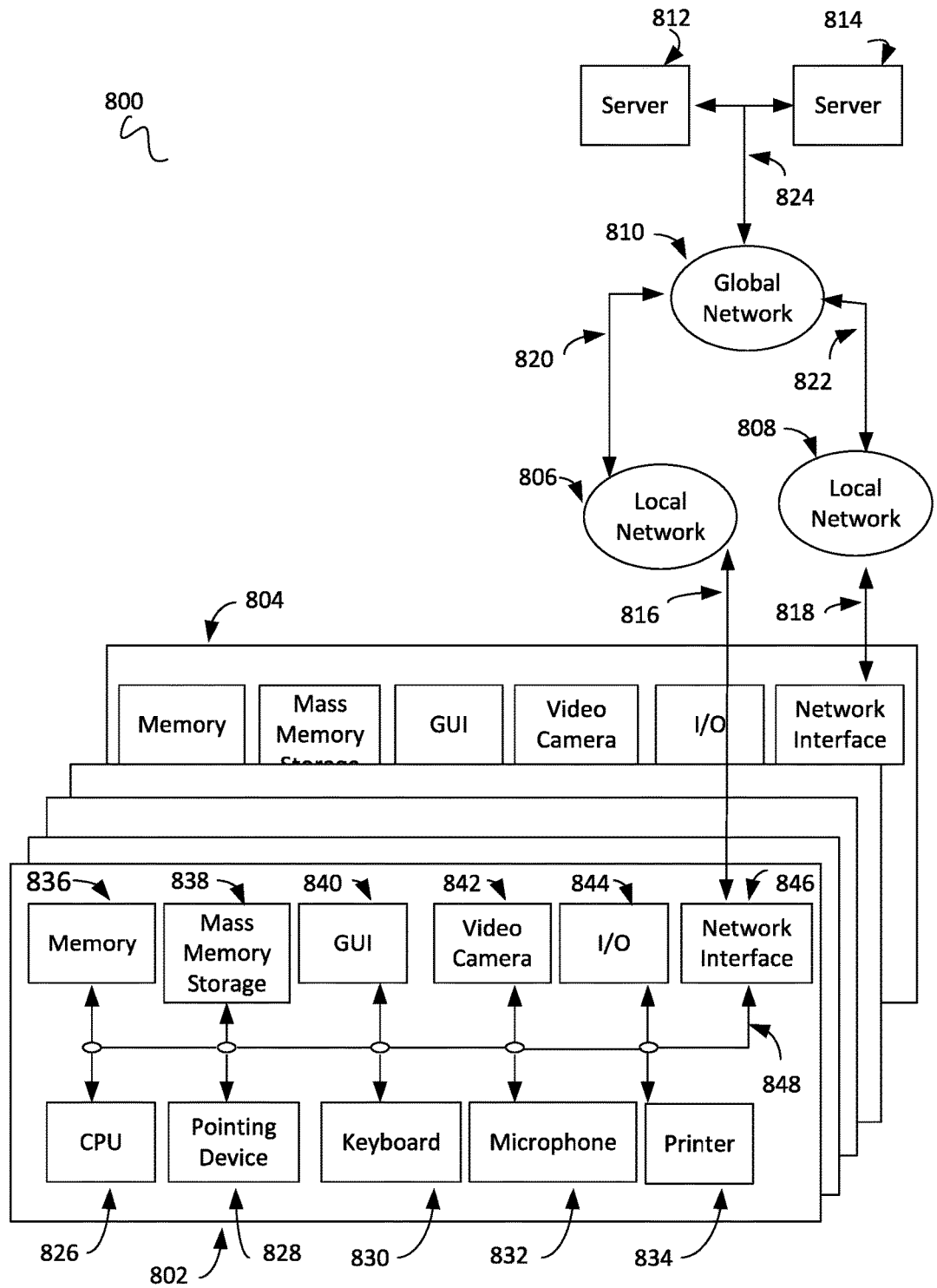
FIG. 8 illustrates a block diagram depicting an exemplary client/server system which may be used by an exemplary web-enabled/networked embodiment of the present invention.

FIG. 8 illustrates a block diagram depicting an exemplary client/server system which may be used by an exemplary web-enabled/networked embodiment of the present invention.

A communication system 800 includes a multiplicity of clients with a sampling of clients denoted as a client 802 and a client 804, a multiplicity of local networks with a sampling of networks denoted as a local network 806 and a local network 808, a global network 810 and a multiplicity of servers with a sampling of servers denoted as a server 812 and a server 814.

Client 802 may communicate bi-directionally with local network 806 via a communication channel 816. Client 804 may communicate bi-directionally with local network 808 via a communication channel 818. Local network 806 may communicate bi-directionally with global network 810 via a communication channel 820. Local network 808 may communicate bi-directionally with global network 810 via a communication channel 822. Global network 810 may communicate bi-directionally with server 812 and server 814 via a communication channel 824. Server 812 and server 814 may communicate bi-directionally with each other via communication channel 824. Furthermore, clients 802, 804, local networks 806, 808, global network 810 and servers 812, 814 may each communicate bi-directionally with each other.

In one embodiment, global network 810 may operate as the Internet. It will be understood by those skilled in the art that communication system 800 may take many different forms. Non-limiting examples of forms for communication system 800 include local area networks (LANs), wide area networks (WANs), wired telephone networks, wireless networks, or any other network supporting data communication between respective entities.

Clients 802 and 804 may take many different forms. Non-limiting examples of clients 802 and 804 include personal computers, personal digital assistants (PDAs), cellular phones and smartphones.

Client 802 includes a CPU 826, a pointing device 828, a keyboard 830, a microphone 832, a printer 834, a memory 836, a mass memory storage 838, a GUI 840, a video camera 842, an input/output interface 844 and a network interface 846.

CPU 826, pointing device 828, keyboard 830, microphone 832, printer 834, memory 836, mass memory storage 838, GUI 840, video camera 842, input/output interface 844 and network interface 846 may communicate in a unidirectional manner or a bi-directional manner with each other via a communication channel 848. Communication channel 848 may be configured as a single communication channel or a multiplicity of communication channels.

CPU 826 may be comprised of a single processor or multiple processors. CPU 826 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 836 is used typically to transfer data and instructions to CPU 826 in a bi-directional manner. Memory 836, as discussed previously, may include any suitable computer-readable media, intended for data storage, such as those described above excluding any wired or wireless transmissions unless specifically noted. Mass memory storage 838 may also be coupled bi-directionally to CPU 826 and provides additional data storage capacity and may include any of the computer-readable media described above. Mass memory storage 838 may be used to store programs, data and the like and is typically a secondary storage medium such as a hard disk. It will be appreciated that the information retained within mass memory storage 838, may, in appropriate cases, be incorporated in standard fashion as part of memory 836 as virtual memory.

CPU 826 may be coupled to GUI 840. GUI 840 enables a user to view the operation of computer operating system and software. CPU 826 may be coupled to pointing device 828. Non-limiting examples of pointing device 828 include computer mouse, trackball and touchpad. Pointing device 828 enables a user with the capability to maneuver a computer cursor about the viewing area of GUI 840 and select areas or features in the viewing area of GUI 840. CPU 826 may be coupled to keyboard 830. Keyboard 830 enables a user with the capability to input alphanumeric textual information to CPU 826. CPU 826 may be coupled to microphone 832. Microphone 832 enables audio produced by a user to be recorded, processed and communicated by CPU 826. CPU 826 may be connected to printer 834. Printer 834 enables a user with the capability to print information to a sheet of paper. CPU 826 may be connected to video camera 842. Video camera 842 enables video produced or captured by user to be recorded, processed and communicated by CPU 826.

CPU 826 may also be coupled to input/output interface 844 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 826 optionally may be coupled to network interface 846 which enables communication with an external device such as a database or a computer or telecommunications or internet network using an external connection shown generally as communication channel 816, which may be implemented as a hardwired or wireless communications link using suitable conventional technologies. With such a connection, CPU 826 might receive information from the network, or might output information to a network in the course of performing the method steps described in the teachings of the present invention.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6).

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing an interactive game application according to the present invention will be apparent to those skilled in the art. Various aspects of the invention have been described above by way of illustration, and the specific embodiments disclosed are not intended to limit the invention to the particular forms disclosed. The particular implementation of the interactive game application may vary depending upon the particular context or application. By way of example, and not limitation, the interactive game application described in the foregoing were principally directed to users using an game application for romantic relationship potential implementations; however, similar techniques may instead be applied to employers seeking for employees, landlords, home owners, and renters seeking roommates, parents seeking babysitters, or essentially any person seeking a particular beneficial relationship with another wherein vetting may be desired, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method comprising:
   requesting, by a first remote client, a webpage address of an interactive compatibility game application from a host server, and wherein said host server is in operable communication with said webpage;
   executing, by said first remote client, a computer-readable instruction to cause a graphical user interface of said first remote client to display said webpage of said interactive game application;
   requesting, by said first remote client, an interactive game application software for downloading via said webpage;
   executing, by said first remote client, said interactive game application software to install an interactive game application data;
   launching or executing, by said first remote client, an interactive game application, said interactive game application comprises said interactive compatibility game application, wherein said interactive compatibility game application is configured to assist users in obtaining knowledge about a potential dating partner, a current dating partner, or a life partner;
   submitting, with said interactive game application, a first user information and a registration request to said host server;
   sending, with said interactive game application, a sign-in request to play to said host server, wherein said sign-in request to play includes submitting a current location;
   submitting, by said first remote client, with said interactive game application, an invite request and a second user information to said host server, wherein said host server verifies a match between said second user information and a previously stored registration information, and wherein said host server sends a first portion of said interactive game application data to said first remote client and a second remote client of said second user information if a match has been found;
   displaying said first portion of said interactive game application data;
   wherein said first portion of said interactive game application data is configured to allow only one of said first remote client and said second remote client to send a response;
   entering and sending, with one of said first remote client and second remote client, feedback to said host server with said first portion of said interactive game application, wherein one of said remote clients do not have the ability to send a response, and wherein said host server sends a second portion of said interactive game application data to said first remote client and second remote client in response to receiving said feedback;

displaying said second portion of said interactive game application data;

wherein said second portion of said interactive game application data is configured to allow both of said first remote client and second remote client to send a response;

sending, with said second portion of said interactive game application, a selection to said host server, wherein both of said first remote client and said second remote client sends a selection to said host server, and wherein said host server sends a third portion of said interactive game application data to said first remote client and second remote client in response to receiving said selection from said first remote client and said second remote client;

displaying said third portion of said interactive game application data;

wherein said third portion of said interactive game application data do not allow either said first and second remote clients to enter or send a response to said host server, and wherein said host server sends a fourth portion of said interactive game application data including a continue option to said first remote client and second remote client;

displaying said fourth portion of said interactive game application data;

choosing at said fourth portion of said interactive game application data, by at least one or both of said first and second remote client, with said fourth portion of said interactive game application data, at least one of, a positive approval and a negative approval, in response to receiving said continue option.

2. The method of claim 1, wherein if a match has been found in said verification process between said second user information and a previously stored registration information, a gaming module is configured to send a play option message to said second remote client, using said first user information and said second user information.

3. The method of claim 2, wherein said gaming module is further configured to choose said remote client who sent said invite request to respond in said first portion of said interactive game application data.

4. The method of claim 2, wherein said gaming module is further configured to choose said remote client that receive said invite request to respond in said first portion of said interactive game application data.

5. The method of claim 2, wherein said gaming module is further configured to alternate said remote clients to respond in said first portion of said interactive game application data.

6. The method of claim 5, further comprising submitting, with said fourth portion of said interactive game application, a positive approval to said host server.

7. The method of claim 1, wherein said third portion of said interactive game application data comprises a compatibility percentage based on an accumulation of responses by said first and second remote clients that are the same.

8. The method of claim 7, wherein at least one of said first and second remote client is randomly designated as a non-responding remote client, and wherein said non-responding remote client does not have the ability to submit a response to said host server.

9. The method of claim 8, wherein said host server presents to said responding remote client, in said first portion of said interactive game application, a request to provide an open message, said open message comprises a question and corresponding multiple choice answers that said host server sends as a part of said second portion of said interactive application data.

10. The method of claim 9, wherein said third portion of said interactive game application data is configured to allow said first and second remote client to view said third portion of said interactive game application data.

11. The method of claim 10, wherein said fourth portion of interactive game application data is configured to allow said first remote client and said second remote client to send at least one of said positive approval and negative approval, to said host server.

12. The method of claim 1, further comprising presenting a list of registered users information including, at least one of, a current location, a residence location, and a picture in said first remote client.

13. The method of claim 12, further comprising selecting a registered user from said list of registered users, to send an invite to, via said host server.

14. The method of claim 13, wherein said first portion of said interactive game application data is configured to allow only said selecting remote client as a responding remote client to send a response to said host server.

15. The method of claim 14, wherein said responding remote client to said first portion of interactive game application data may change in a following round if said first remote client and second remote client responses to said second portion of interactive game application are different.

16. A method comprising:

requesting, with a first means for playing an interactive compatibility game, a webpage address from a game facilitating means;

requesting, by said first means for playing a game, an interactive game application software for downloading via said webpage;

launching or executing, with said interactive game application software, an interactive game application, said interactive game application comprises said interactive compatibility game;

wherein said interactive compatibility game is configured to assist users in obtaining knowledge about a potential dating partner, a current dating partner, or a life partner;

submitting, by said first means for playing a game, with said interactive game application, a first user information and a registration request to said game facilitating means;

sending, by said first means for playing a game, with said interactive game application, a sign-in request to play, to said game facilitating means;

submitting, by said first means for playing a game, with said interactive game application, an invite request and a second user information of a second means for playing a game to said game facilitating means;

wherein said game facilitating means verifies a match between said second user information and a previously stored registration information, and wherein said game facilitating means sends a first portion of said interactive game application data to said first means for playing a game and said second means for playing a game;

displaying said first portion of said interactive game application data;

wherein said first portion of said interactive game application data is configured to allow only one of said first means for playing a game and said second means for playing a game to send a response to said game facilitating means;

entering and sending, with said first portion of said interactive game application, a feedback to said game facilitating means, wherein one of said first and second means for playing a game do not have the ability to send a feedback, and wherein said game facilitating means sends a second portion of said interactive game application data to said first means for playing a game and said second means for playing a game;

wherein said game facilitating means presents to said responding remote client, in said first portion of said interactive game application, to provide an open message, said open message comprises a question and corresponding multiple choice answers that said game facilitating means sends as part of said second portion of said interactive application data;

displaying said second portion of said interactive game application data;

wherein said second portion of said interactive game application data is configured to allow both of said first means for playing a game and second means for playing a game to send a response to said game facilitating means;

sending, with said second portion of said interactive game application, a selection to said game facilitating means, wherein both of said first means for playing a game and said second means for playing a game sends a selection to said game facilitating means, and wherein said game facilitating means sends a third portion of said interactive game application data to said first remote client and second remote client in response to receiving said selection from said first means for playing a game and said second means for playing a game;

displaying said third portion of said interactive game application data;

wherein said third portion of said interactive game application data do not allow either said first or second means for playing a game to enter or send a response to said game facilitating means, and wherein said game facilitating means sends a fourth portion of said interactive game application data including a continue option to said first and second means for playing said game;

displaying said fourth portion of said interactive game application data;

choosing at said fourth portion of said interactive game application data, with at least one or both of said first and second means for playing said game, at least one of, a positive approval and a negative approval, in response to receiving said continue option, wherein one or both of said first means for playing a game and said second means for playing a game sends said positive approval and negative approval to said game facilitating means.

17. The method of claim 16, further comprising:
receiving, with said interactive game application, said first portion of said interactive game application data; and
sending, with said interactive game application, a response to said first portion of said interactive game application data.

18. The method of claim 17, further comprising:
receiving, with said interactive game application, said second portion of said interactive game application data; and sending, with said interactive game application, a response to said second portion of said interactive game application data.

19. The method of claim 18, further comprising:
receiving, with said interactive game application, said third portion of said interactive game application data; and
viewing, with said interactive game application, responses to said third portion of said interactive game application data.

20. A system comprising:
means for facilitating an interactive compatibility game application;
means for playing said game, in which said playing means is a first means for playing said game, wherein said first playing means is configured to:
request a webpage address from said game application facilitating means;
execute a computer-readable instruction to cause a graphical user interface of said first playing means to display a webpage of an interactive game application;
request an interactive game application software for downloading via said webpage;
execute a computer-readable instruction to install an interactive game application data,
wherein said interactive game application data includes said interactive compatibility game application, and wherein said interactive compatibility game application is configured to assist users in obtaining knowledge about a potential dating partner, a current dating partner, or a life partner;
submit, with said interactive game application, a first user information and a registration request to said game application facilitating means;
send, with said interactive game application, a sign-in request to play said game with a second means for playing said game;
submit, with said interactive game application, an invite request and a second user information to said game application facilitating means, wherein said game application facilitating means is configured to send a first portion of said interactive game application data to said first playing means and second playing means;
visually present said first portion of said interactive game application data;
wherein said first portion of said interactive game application data is configured to allow only one of said first means for playing said game and said second means for playing said game to send a response to said game facilitating means;
enter and send a response, with said first portion of said interactive game application, to said game application facilitating means, said response comprises a feedback, wherein one of said first and second means for playing said game do not have the ability to send a feedback, and wherein said game application facilitating means is configured to send a second portion of said interactive game application data to said first playing means and second playing means;
wherein a gaming module is configured to choose said remote client who sent said invite request to respond in said first portion of said interactive game application data
visually present said second portion of said interactive game application data;

wherein said second portion of said interactive game application data is configured to allow both of said first means for playing said game and second means for playing said game to send a response to said game facilitating means;

send a selection, with said second portion of said interactive game application, to said game application facilitating means, wherein both of said first means for playing said game and said second means for playing said game sends a selection to said game facilitating means, and wherein said game application facilitating means is configured to send a third portion of said interactive game application data to said first remote client and second playing means in response to receiving said selection from said first means for playing said game and said second means for playing said game;

display, with said interactive game application, said third portion of said interactive game application data, wherein said third portion of said interactive game application data do not allow either said first or second means for playing said game to enter or send a response to said game facilitating means, and wherein said game application facilitating means is configured to send a fourth portion of said interactive game application data including a continue option to said first remote client and second playing means;

display said fourth portion of said interactive game application data;

choose, at said fourth portion of said interactive game application data, at least one of, a positive approval and a negative approval, in response to receiving said continue option, wherein one or both of said first means for playing said game and said second means for playing said game sends said positive approval and negative approval to said game facilitating means.

* * * * *